(12) United States Patent
Kim et al.

(10) Patent No.: US 12,418,717 B2
(45) Date of Patent: Sep. 16, 2025

(54) PHOTOGRAPHING CONTROL METHOD AND DEVICE

(71) Applicant: Samsung Electronics Co., Ltd., Suwon-si (KR)

(72) Inventors: Jiyoun Kim, Suwon-si (KR); Saebyuk Sheen, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 91 days.

(21) Appl. No.: 18/465,536

(22) Filed: Sep. 12, 2023

(65) Prior Publication Data

US 2024/0007740 A1    Jan. 4, 2024

Related U.S. Application Data

(63) Continuation of application No. PCT/KR2022/003227, filed on Mar. 8, 2022.

(30) Foreign Application Priority Data

Mar. 17, 2021    (KR) .................. 10-2021-0034769

(51) Int. Cl.
*H04N 5/232* (2006.01)
*G06T 1/00* (2006.01)
(Continued)

(52) U.S. Cl.
CPC .......... *H04N 23/64* (2023.01); *G06T 1/0021* (2013.01); *G06T 7/20* (2013.01); *H04N 23/611* (2023.01);
(Continued)

(58) Field of Classification Search
CPC ...... H04N 23/64; H04N 23/611; H04N 23/62; H04N 23/631; H04N 23/635; H04N 23/61;
(Continued)

(56) References Cited

U.S. PATENT DOCUMENTS 8,493,477 B2 * 7/2013 Kubota ................ H04N 23/611
                                                    348/240.99
10,015,406 B2 * 7/2018 Ogawa ................. G06V 40/161
(Continued)

FOREIGN PATENT DOCUMENTS

JP          5791448 B2      10/2015
KR      10-0147572 B1       9/1998
(Continued)

OTHER PUBLICATIONS

Extended European Search Report dated Jul. 8, 2024, issued in European Application No. 22771664.4-1207.
(Continued)

*Primary Examiner* — Howard D Brown, Jr.
(74) *Attorney, Agent, or Firm* — Jefferson IP Law, LLP

(57) ABSTRACT

A photographing control method and device are provided. The photographing control method includes receiving an input image including at least one subject from a camera, determining a main subject among the at least one subject, setting a position option for determining an arrangement in an output image of the main subject, and generating the output image having composition satisfying the position option, based on the input image.

20 Claims, 20 Drawing Sheets

(51) Int. Cl.
  *G06T 7/20* (2017.01)
  *H04N 23/60* (2023.01)
  *H04N 23/611* (2023.01)
  *H04N 23/62* (2023.01)

(52) U.S. Cl.
  CPC ... *H04N 23/62* (2023.01); *G06T 2207/30201* (2013.01)

(58) Field of Classification Search
  CPC .................. G06T 1/0021; G06T 7/20; G06T 2207/30201; G06T 7/292
  See application file for complete search history.

(56) References Cited

U.S. PATENT DOCUMENTS

| | | | | |
|---|---|---|---|---|
| 2005/0001024 | A1* | 1/2005 | Kusaka | G06F 3/005 340/5.2 |
| 2006/0255986 | A1* | 11/2006 | Takanezawa | H04N 23/661 348/E5.053 |
| 2010/0074557 | A1* | 3/2010 | Oku | G06V 10/25 382/298 |
| 2016/0295125 | A1* | 10/2016 | Osawa | H04N 23/69 |

FOREIGN PATENT DOCUMENTS

| | | |
|---|---|---|
| KR | 10-1653041 B1 | 8/2016 |
| KR | 10-2018-0081918 A | 7/2018 |
| KR | 10-2019-0064958 A | 6/2019 |
| KR | 10-2101740 B1 | 4/2020 |

OTHER PUBLICATIONS

'LG G6 Review—Camera Edition' 360-degree camera + focus peaking seems to be great, https://blog.bsmind.co.kr/1888, Mar. 18, 2017.
Real-time Tracking _ Sony _ α—YouTube, https://youtu.be/bvn6t6laKXs, Jan. 15, 2019.
Sony A6400 Tutorial—Autofocus Settings for Video Explained—YouTube, https://youtu.be/v52ji-tXpGU, May 26, 2020.
International Search Report dated Jun. 9, 2022, issued in International Patent Application No. PCT/KR2022/003227.

* cited by examiner

PHOTOGRAPHING CONTROL METHOD AND DEVICE

CROSS-REFERENCE TO RELATED APPLICATION(S)

This application is a continuation application, claiming priority under § 365(c), of an International application No. PCT/KR2022/003227, filed on Mar. 8, 2022, which is based on and claims the benefit of a Korean patent application number filed on Mar. 17, 2021, in the Korean Intellectual Property Office, the disclosure of which is incorporated by reference herein in its entirety.

BACKGROUND

1. Field

The disclosure relates to a photographing control method and device.

2. Description of Related Art

Recently, the spread of portable devices, such as smartphones or tablet devices, and the improved specification of cameras mounted on the portable devices have enabled the portable devices to be used for professional photographing. In addition, with the recent widespread of network services, such as social network services or photo and video sharing services, there has been growing interest of users in techniques of capturing photos and videos. Current popular camera applications support convenient functions, such as automatic focusing, automatic white balancing, or post-editing, but a function of setting photography composition depends on the users' individual abilities. In the current situation, the quality of capturing results may vary depending on the users' individual abilities, and a user group who is not accustomed to using electronic devices may not obtain desired results.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method of proposing photography composition suitable for a scene or directly controlling the photography composition.

Additional aspects will be set forth in part in the description which follows and, in part, will be apparent from the description, or may be learned by practice of the presented embodiments.

In accordance with an aspect of the disclosure, a photographing control method is provided. The photographing control method includes receiving an input image including at least one subject from a camera, determining a main subject among the at least one subject, setting a position option for determining an arrangement in an output image of the main subject, and generating the output image having composition satisfying the position option, based on the input image.

In accordance with another aspect of the disclosure, a photographing control device is provided. The photographing control device includes a processor and a memory including instructions executable in the processor, in which, when the instructions are executed in the processor, the processor is configured to determine a main subject among at least one subject of an input image, set a position option for determining an arrangement in an output image of the main subject, and generate the output image having composition satisfying the position option, based on the input image.

In accordance with another aspect of the disclosure, an electronic device is provided The electronic device includes a camera configured to generate an input image including at least one subject and a processor configured to determine a main subject among the at least one subject of the input image, set a position option for determining an arrangement in an output image of the main subject, set a main tracking option for determining a main tracking area of the main subject, and generate the output image having composition satisfying the position option and the main tracking option, based on the input image.

Another aspect of the disclosure is to provide a method of proposing photography composition suitable for a scene or directly controlling the photography composition to improve photography convenience and the quality of photography results.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
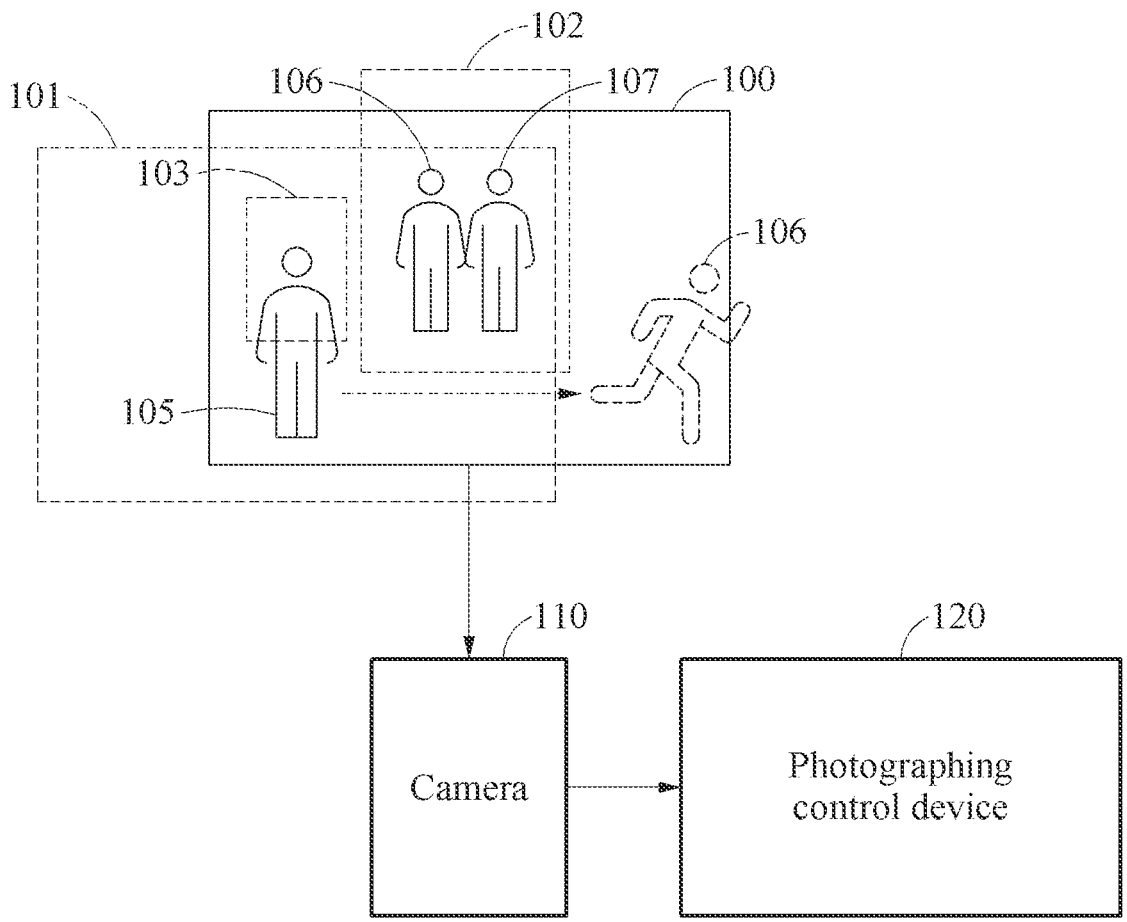
FIG. 1 is a diagram illustrating a framing operation of a photographing control device, according to an embodiment of the disclosure.

FIG. 1 is a diagram illustrating a framing operation of a photographing control device, according to an embodiment of the disclosure.

Referring to FIG. 1, a camera 110 may generate an input image by capturing at least some of subjects 105, 106, and 107. Although the subjects 105, 106, and 107 correspond to people, subjects other than people may also be captured. A photographing control device 120 may generate an output image based on the input image. For example, the photographing control device 120 generates the output image by using the composition of at least a portion of the input image as it is and may generate the output image by changing the composition of at least the other portion of the input image. The photographing control device 120 may generate a recorded image by recording at least a portion of the output image. The input image and the output image may be a video image including a plurality of frames. When the plurality of frames of the output image is recorded in the recorded image, the recorded image may be a video image, and a still image may be generated by extracting one frame from the output image.

The photographing control device 120 may generate the output image by performing framing, based on the input image. The photographing control device 120 may satisfy a framing option that is set by a user in an image capturing process through framing or is preset by an expert. For example, the framing option includes at least one of a position option and a tracking option, in which the position option determines the arrangement of a target subject in the input image and the tracking option determines a tracking area of the target subject. The target subject may be a target, to which the framing option is applied, among the subjects 105, 106, and 107 in the input image. The target subject may include a main subject and a sub-subject. The main subject may be one, and the sub-subject may be none or at least one.

The photographing control device 120 may determine the main subject among the subjects 105, 106, and 107 and may set the position option and/or the tracking area of the main subject. The photographing control device 120, if necessary, may determine the sub-subject among the rest of the subjects 105, 106, and 107, which does not correspond to the main subject, and may set the tracking area of the sub-subject. When position options are respectively set for a plurality of target subjects, there may not be composition satisfying all the position options, and thus the position option may only be applied to the main subject.

For example, the position option may include at least one of a first position option, a second position option, and a third position option, in which the first position option arranges the main subject in the left area of the output image, the second position option arranges the main subject in the center area of the output image, and the third position option arranges the main subject in the right area of the output image. The tracking option may include at least one of a first tracking option, a second tracking option, a third tracking option, and a fourth tracking option, in which the first tracking option tracks a face of the main subject, the second tracking option tracks the upper body of the main subject, the third tracking option tracks the full body of the main subject, and the fourth tracking option tracks a custom region defined for the main subject. However, the position options and the tracking options are just examples, and position options and/or tracking options different from said position options and said tracking options may be additionally used, or some of the position options and the tracking options may be excluded.

Referring to a scene 100 of FIG. 1, the framing operation of the photographing control device 120 is described in detail. The photographing control device 120 may generate the output image by applying various types of composition satisfying the framing option to the scene 100. For example, when the framing option is set such that the subject 105 is determined to be the main subject, the subjects 106 and 107 are determined to be the sub-subjects, the main subject is arranged in the center area of the output image, and the full body of the main subject and the sub-subjects is tracked, the photographing control device 120 may frame the scene 100 with first composition 101.

On the other hand, when the framing option is set such that the subjects 106 and 107 are determined to be one main subject as they overlap with each other, the main subject is arranged in the center area of the output image, and the full body of the main subject and the sub-subject is tracked, the photographing control device 120 may frame the scene 100 with second composition 102. When the tracking area of the main subject is changed to the upper body during the framing of the first composition 101, the photographing control device 120 may frame the scene 100 with third composition 103. When the subject 105 moves to a position (i.e., subject 106), the photographing control device 120 may change a capturing angle of the third composition 103 to include the upper body of the subject 105. The scene 100 of FIG. 1 and the framing operation related to the scene 100 are just examples, and the photographing control device 120 may perform various other framing operations. The framing operation of the photographing control device 120 is further described below.

The photographing control device 120 may perform at least one of the control of the camera 110 and the processing (e.g., post-processing) of the input image to derive the composition satisfying the framing option. The control of the camera 110 may be hardware control. The photographing control device 120 may adjust photography composition of the input image to desired composition and may derive the output image of the composition satisfying the framing option. Alternatively, the processing of the input image may be software control. The photographing control device 120 may edit the input image into desired composition and derive the output image of the desired composition. The photographing control device 120 may generate the output image of the desired composition by using a capturing environment and/or, if necessary, at least one of camera control and input image processing.

The photographing control device 120 may control the camera 110 by using a hardware function of the camera 110. For example, the hardware function includes at least one of a change of a capturing lens (e.g., the change of the capturing lens from a wide-angle lens to a telephoto lens), optical zoom, lens tilting, and lens movement. The lens tilting may be a change of a capturing angle of a lens while a capturing position of the lens is fixed, and the lens movement may be a change of the capturing position of the lens while the capturing angle of the lens is fixed. However, the foregoing examples are just examples, and the hardware function may not include some of the foregoing examples or further include various other functions. For example, when there is an accessory (e.g., capturing equipment) for controlling the camera 110 and/or an electronic device including the camera 110, the control of the camera 110 includes the control of the accessory, and the hardware function may include a function of the accessory.

The processing (e.g., the post-processing) of the input image may include at least one of the cropping of the input image, digital zooming, and a change of a point of view. The change of the point of view may be a processing operation of the input image having an effect of changing a capturing angle and/or a capturing position. According to an embodiment, the photographing control device 120 may perform the processing of the input image by implementing the hardware function of the camera 110 in software. For example, the photographing control device 120 implements the hardware function, such as the lens tilting and/or the lens movement, through the processing of the input image.

Figure 2:
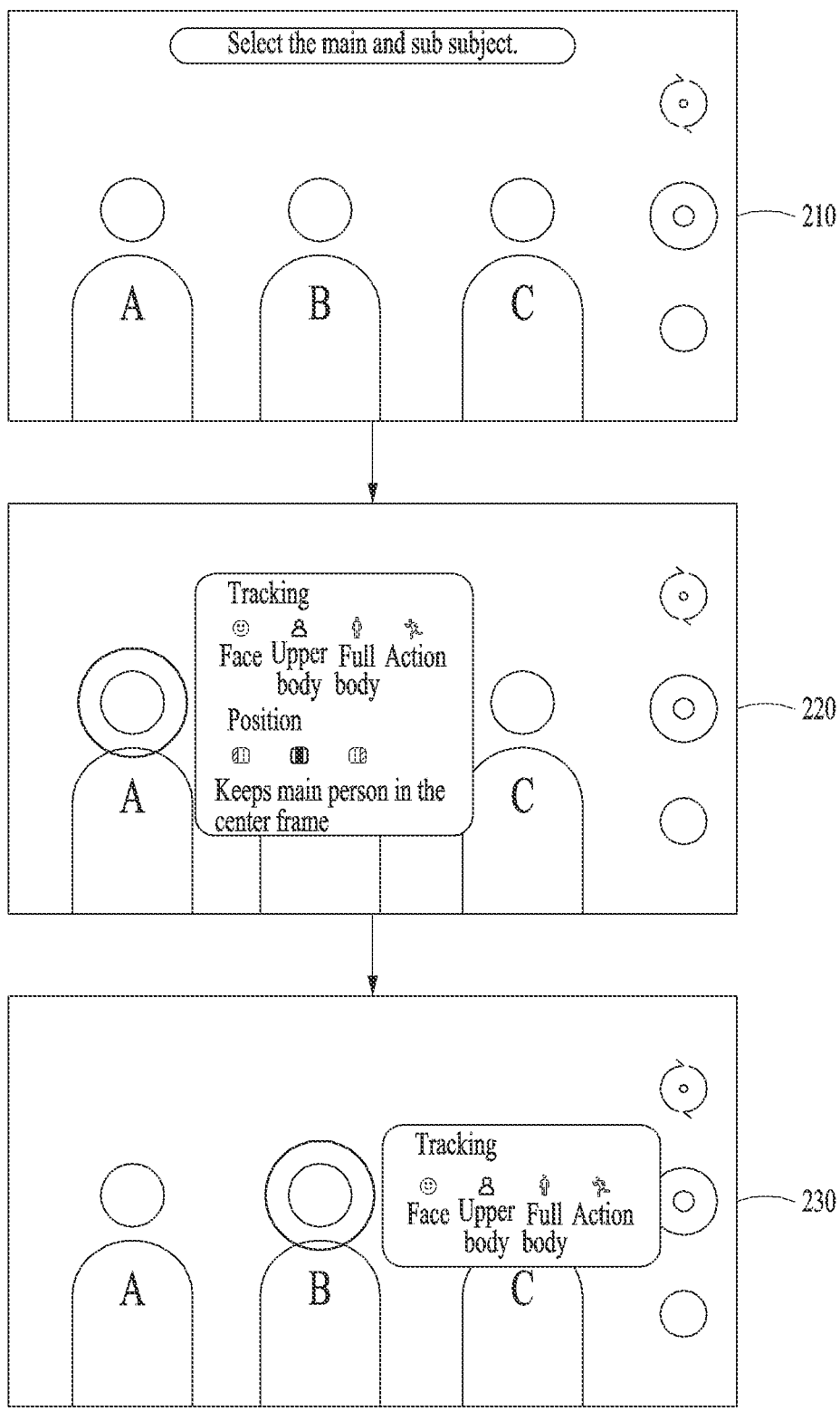
FIG. 2 is a diagram illustrating an operation of setting a target subject and framing options, according to an embodiment of the disclosure.

FIG. 2 is a diagram illustrating an operation of setting a target subject and framing options, according to an embodiment of the disclosure.

A photographing control device may generate an output image by applying composition according to the framing options. Capturing screens 210, 220, and 230 of FIG. 2 may include at least a portion of the output image. A user may set the target subject and the framing options while viewing the capturing screens 210, 220, and 230 and may generate a recorded image by pressing a recording button when desired composition is applied according to a set value.

Referring to FIG. 2, the target subject and the framing options may be set through the capturing screens 210, 220, and 230. For example, as shown in a first capturing screen 210, a message instructing to select a main subject and a sub-subject may be exposed in the output image. The photographing control device may adjust the composition to an ultrawide angle to easily identify the target subject while selecting the target subject. The user may select a first subject A as the main subject in a second capturing screen 220 and may set the framing options for the main subject. For example, the user may select the first subject A as the main subject by tapping the first subject A on a screen, and then a menu for selecting the framing options may be displayed. The framing options for the main subject may include a position option and a tracking option.

The user may select a second subject B as the sub-subject in a third capturing screen 230 and may set the framing options for the sub-subject. For example, the user selects the second subject B as the sub-subject by tapping the second subject B on the screen, and then the menu for selecting the framing options may be displayed. The framing options for the sub-subject may include a tracking option. The framing options for the main subject may be referred to as main framing options, and the framing options for the sub-subject may be referred to as sub-framing options. In addition, the tracking option for the main subject may be referred to as a main tracking option, and the tracking option for the sub-subject may be referred to as a sub-tracking option.

The position option may include at least one of a first position option, a second position option, and a third position option, in which the first position option arranges the main subject in the left area of the output image, the second position option arranges the main subject in the center area of the output image, and the third position option arranges the main subject in the right area of the output image. However, said position options are just examples, and other position options different from them may be additionally used, or some of them may be excluded. When the position option is set, the photographing control device may adjust the composition of the output image such that the set position option is reflected. For example, the user selects the second position option among position options displayed on the second capturing screen 220, and the photographing control device adjusts the composition of the output image such that the first subject A is arranged in the center area of the output image.

The tracking option may include at least one of a first tracking option, a second tracking option, a third tracking option, and a fourth tracking option, in which the first tracking option tracks a face of the target subject, the second tracking option tracks the upper body of the target subject, the third tracking option tracks the full body of the target subject, and the fourth tracking option tracks a custom region defined for the target subject. However, said tracking options are just examples, and tracking options different from them may be additionally used, or some of them may be excluded. When the tracking option is set, the photographing control device may adjust the composition of the output image such that the set tracking option is reflected. For example, the user may select the second tracking option among main tracking options displayed on the second capturing screen 220 and may select the second tracking option among sub-tracking options displayed on the third capturing screen 230. The photographing control device may adjust the composition of the output image while tracking the upper body of the first subject A and the upper body of the second subject B.

Although the example of setting the target subject and the framing options by the user's manipulation is described above, the photographing control device may intervene in at least some of the operation of setting the target subject and/or the framing options. According to an embodiment, the photographing control device may set the target subject and the framing options by using a framed order. For example, when the first subject A, the second subject B, and a third subject C are sequentially framed, the photographing control device sets the first subject A as the main subject and may display the framing option menu for the first subject A. According to an embodiment, the photographing control device may set the target subject and the framing options, based on sound detected from subjects. For example, when the sound of the first subject A is the loudest, the photographing control device sets the first subject A as the main subject. In this case, the photographing control device may not automatically set the first subject A as the main subject, may ask the user whether to set the first subject A as the main subject, and may set the first subject A as the main subject when the user confirms. In addition, the photographing control device may automatically set at least some of the framing options by analyzing a current output image (e.g., subjects and/or background in the current output image) without the user's selection of the framing options.

Figure 3:
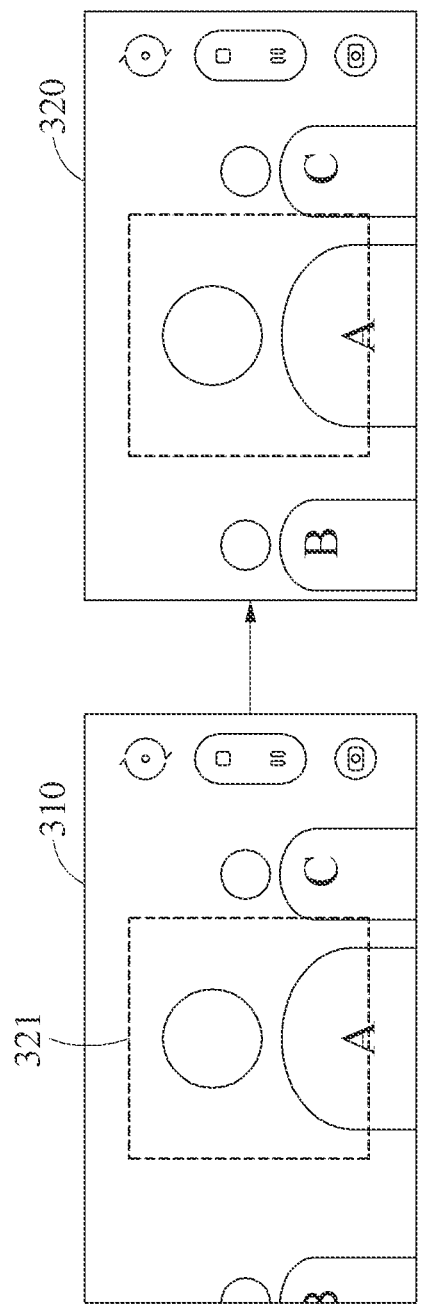
FIGS. 3, 4, and 5 are diagrams each illustrating a framing operation using motion of a sub-subject, according to various embodiments of the disclosure.
Figure 4:
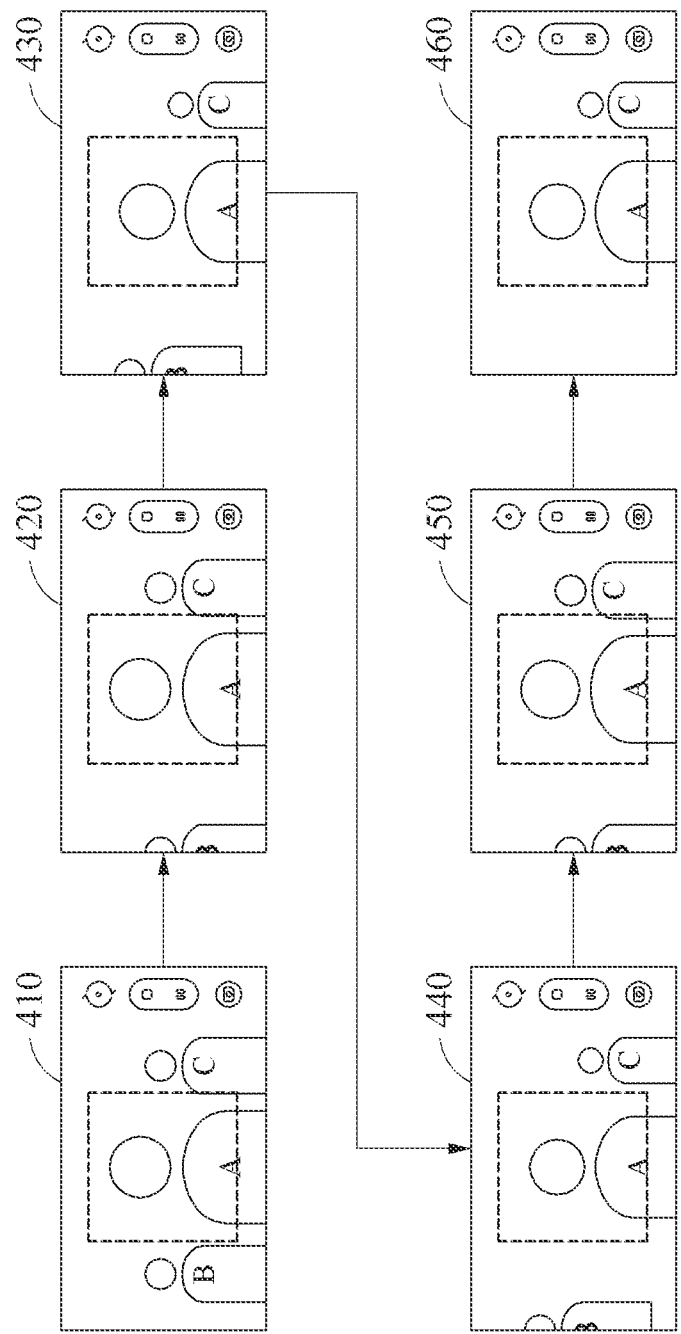
Figure 5:
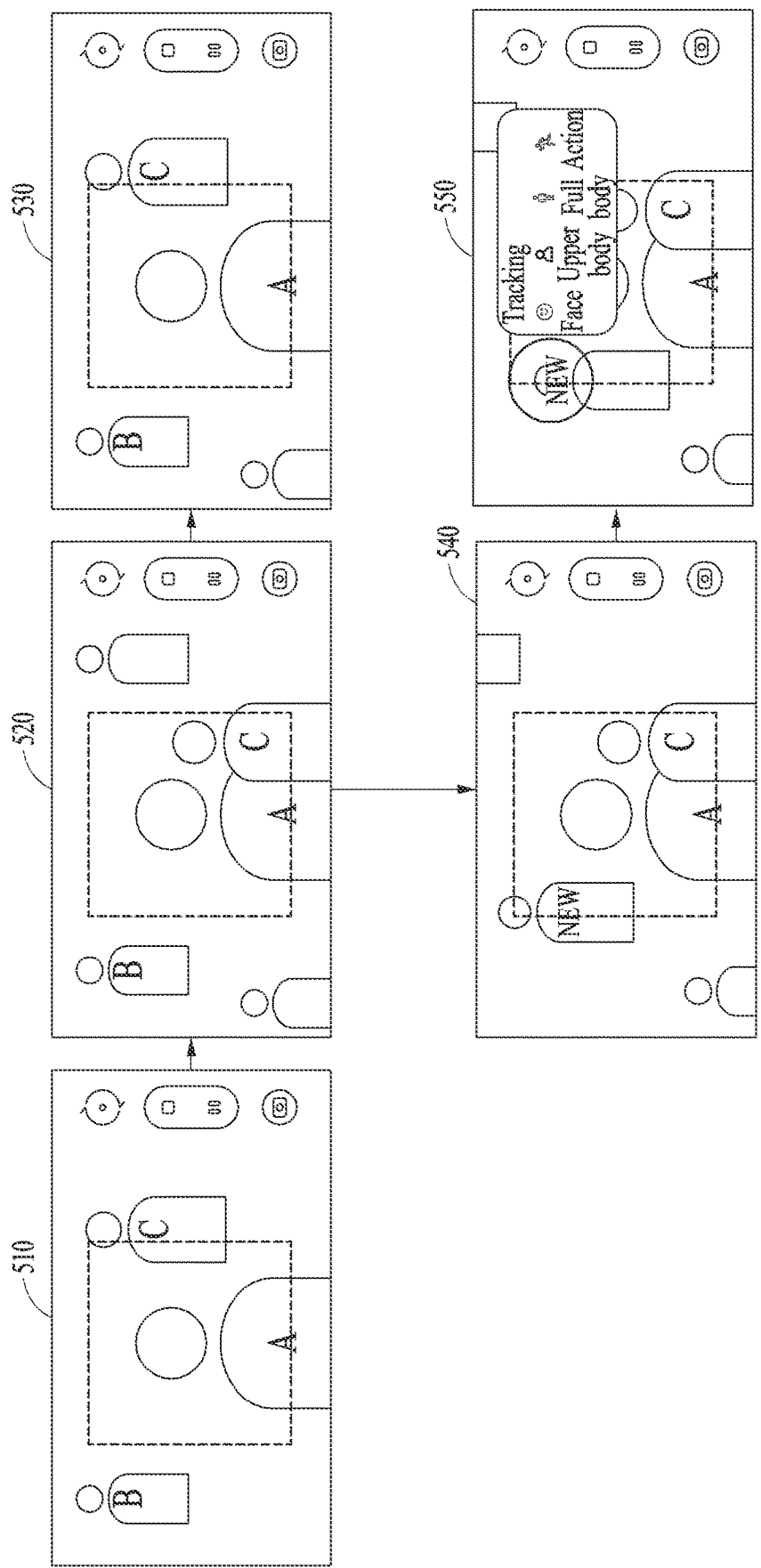

FIGS. 3, 4, and 5 are diagrams each illustrating a framing operation using the motion of a sub-subject, according to various embodiments of the disclosure.

FIGS. 3 to 5 illustrates a situation in which recording is started through a recording button after the setting of a target subject and framing options is completed as described above with reference to FIG. 2. Values set for the target subject and the framing options in FIG. 2 may be applied to the framing operation of FIGS. 3 to 5. In addition, the order of capturing screens of FIGS. 2 to 6 may represent the flow of time.

Referring to FIG. 3, the upper body of a first subject A may be arranged in a region of interest 321 of a fourth capturing screen 310, and a second subject B may be arranged outside composition. In this case, a photographing control device may adjust the composition such that the upper body of the second subject B may be included in a frame as shown in a fifth capturing screen 320. For example, the photographing control device adjusts a camera angle to the left, may adjust a zoom to a wide angle, may replace a lens with a wide-angle lens, or may process an input image to create such effects. The photographing control device may apply audiovisual effects, such as blurring, fading-in, fading-out, and speed ramping, to naturally display composition changes when performing the composition changes, such as angle adjustment, zoom adjustment, lens replacement, and image processing. The foregoing audiovisual effects are just examples, and various other audiovisual effects may be applied.

Referring to FIG. 4, the photographing control device may maintain the composition such that the first subject A is arranged in the center area as shown in a sixth capturing screen 410 and the upper body of the first subject A and the upper body of the second subject B are included. A seventh capturing screen 420 may indicate a situation in which the second subject B deviates from the composition, and in this case, the photographing control device may adjust the composition to include the second subject B in the frame. For example, the photographing control device adjusts a camera angle to the left, may adjust a zoom to a wide angle, may replace a lens with a wide-angle lens, or may process an input image to create such effects.

However, like an eighth capturing screen 430, a ninth capturing screen 440, and a tenth capturing screen 450, despite the framing of the photographing control device, when the second subject B continues to deviate, or the second subject B is completely out of the frame, the tracking of the second subject B may be stopped. In this case, completely out of the frame may include escaping from the maximum angle of view of a camera. When the tracking of the second subject B is stopped, the photographing control device may delete set values (e.g., the designation of a sub-subject and tracking options) for the second subject B and may only reflect set values (e.g., the designation of a main subject, position options, and tracking options) for the first subject A on the photography composition as shown in an eleventh capturing screen 460. On the other hand, the photographing control device may maintain the set values for the second subject B and may reflect the set values for the second subject B on the photography composition when the second subject B appears in the frame again. When the composition changes from the tenth capturing screen 450 to the eleventh capturing screen 460, the photographing control device may apply a visual effect to an image for a smooth composition change.

Referring to FIG. 5, the photographing control device may set the composition such that the first subject A is arranged in the center area as shown in a twelfth capturing screen 510 and the upper body of the first subject A are included. The set values for the second subject B are assumed to be deleted. As shown in the twelfth capturing screen 510, the movement of the second subject B and the movement of a third subject C may not affect framing when the framing options for the first subject A corresponding to the main subject are satisfied.

In a thirteenth capturing screen 520, the third subject C does not correspond to the main subject or the sub-subject. However, when maintaining the proximity to the first subject A (the main subject), the first subject A and the third subject C may be combined and treated as one new main subject. In this case, the proximity may include an overlapping state. Whether subjects are combined may be determined based on a combination maintaining time and the degree of proximity. For example, when the combination maintaining time exceeds 5 seconds, and an overlapping area of an existing subject (e.g., the main subject) and a proximal subject is greater than or equal to ⅓ of the existing subject (e.g., the main subject), these subjects may be treated as one subject. In this case, the photographing control device may adjust the composition such that the subject combining the first subject A and the third subject C may be arranged in the center area of the output image. As shown in a 14–1th capturing screen 530, when the combination of the first subject A and the third subject C is released, the first subject A may be treated as a single main subject again.

The photographing control device may display a visual effect for recommending at least one subject as at least one of the main subject and the sub-subject. For example, as shown in a 14–2th capturing screen 540, when a new subject NEW appears in the frame, the new subject NEW is emphasized as a new target subject. In addition, the photographing control device may display the framing options (e.g., tracking options) for the new subject NEW as shown in a fifteenth capturing screen 550. The framing options may be displayed automatically by the photographing control device or may be displayed in response to a tab input of the user for the new subject NEW. When a framing option for the new subject NEW is set, the composition may be adjusted according to the set framing option.

Figure 6:
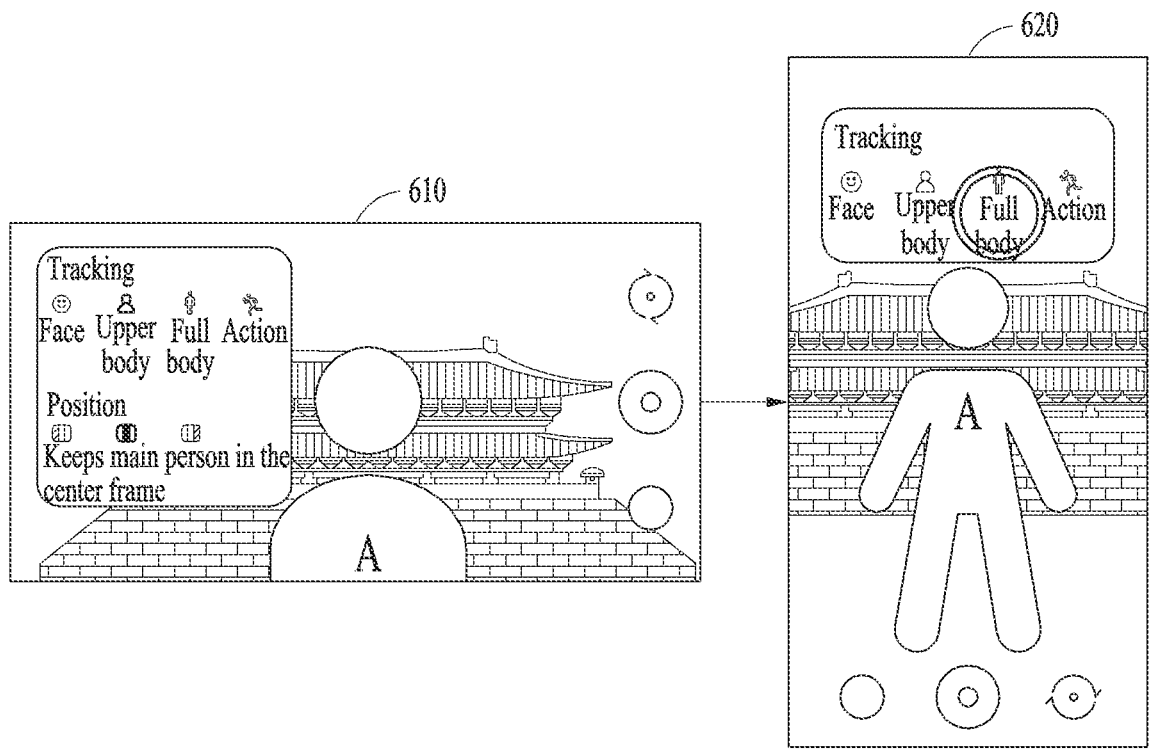
FIG. 6 is a diagram illustrating a framing operation using a screen direction and a background, according to an embodiment of the disclosure.

FIG. 6 is a diagram illustrating a framing operation using a screen direction and a background, according to an embodiment of the disclosure.

Referring to FIG. 6, in a first capturing screen 610, a first subject A may be designated as a main subject. A photographing control device may set appropriate composition, considering the harmony between the main subject and the background (e.g., a palace). For example, as shown in the first capturing screen 610, the photographing control device sets a tracking option as an upper body and a position option to a center arrangement and may adjust the composition to appropriately include the main subject and the background. In addition, the photographing control device may display a message instructing to position a person in the center, and a user may read the message and may appropriately adjust the position of a camera.

The screen direction of the first capturing screen 610 may be a horizontal direction, and the screen direction of a second capturing screen 620 may be a vertical direction. When the screen direction changes, the photographing control device may suggest a framing option that is appropriate for the changed screen direction to the user or may directly apply the appropriate framing option. For example, when the screen direction changes to the vertical direction as shown in the second capturing screen 620, the photographing control device suggests changing the tracking option to full body tracking or may directly change the tracking option.

Figure 7:
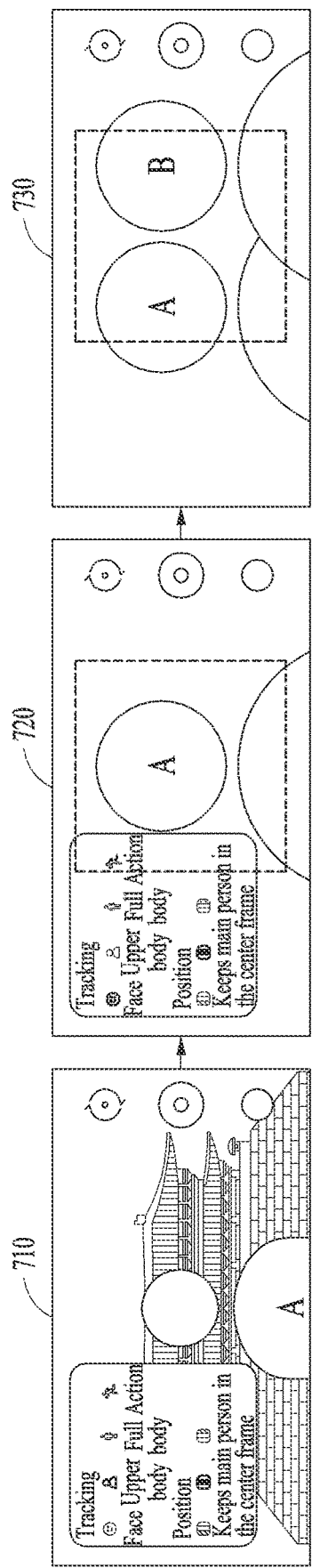
FIG. 7 is a diagram illustrating a framing operation using a change of a background, according to an embodiment of the disclosure.

FIG. 7 is a diagram illustrating a framing operation using a change of a background, according to an embodiment of the disclosure.

Referring to FIG. 7, in a first capturing screen 710, a first subject A may be designated as a main subject. When the first capturing screen 710 switches to a second capturing screen 720, a photographing control device may suggest a framing option appropriate for the second capturing screen 720 to a user or may directly apply the appropriate framing option. For example, when there is no background as shown in the second capturing screen 720, the photographing control device suggests changing a tracking option to face tracking such that the first subject A is emphasized or may directly change the tracking option. When a second subject B enters in the composition as shown in a third capturing screen 730 and is set as a sub-subject, the photographing control device may treat the first subject A and the second subject B as one subject and may change the composition.

Figure 8:
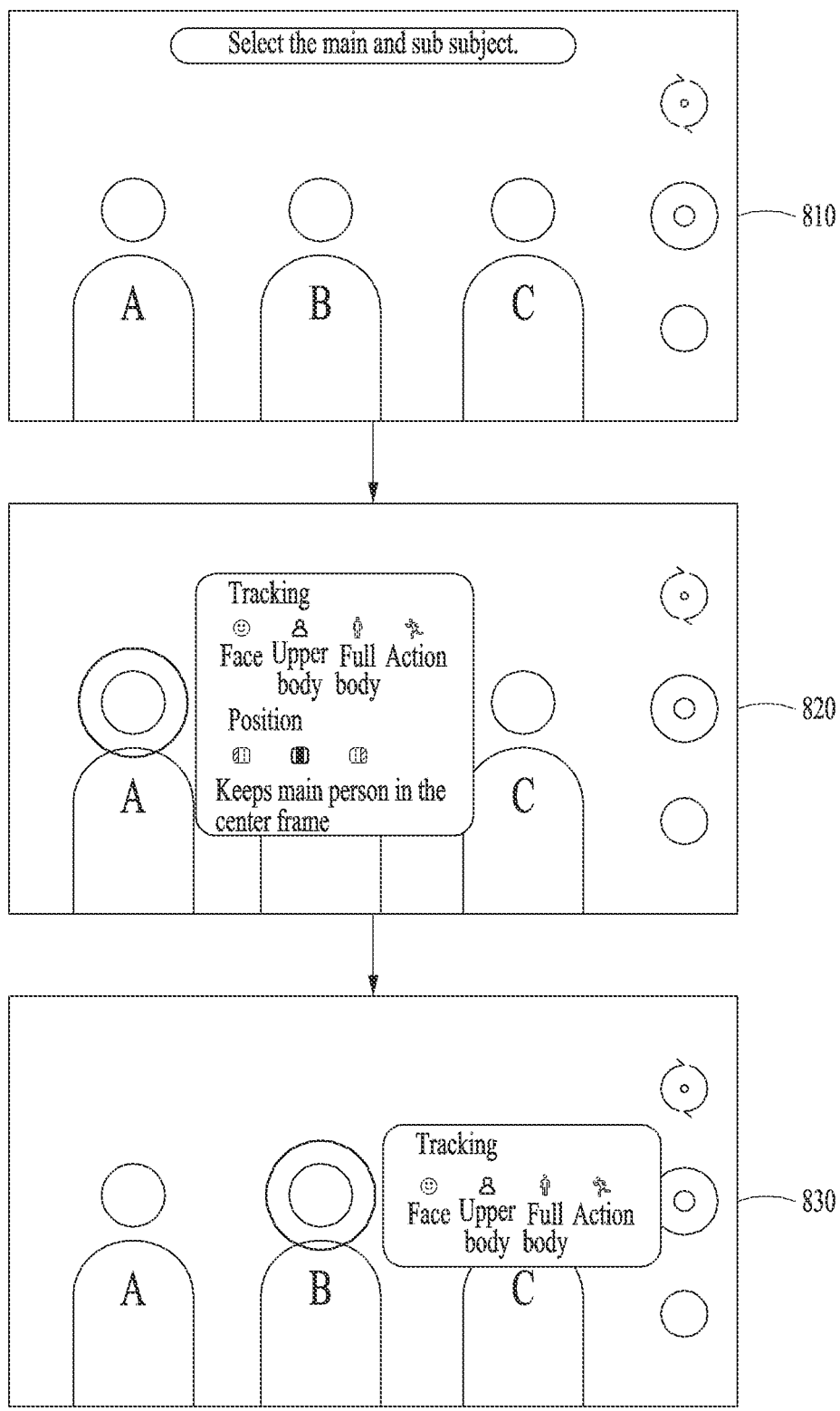
FIGS. 8 and 9 are diagrams each illustrating a framing operation using a plurality of sub-subjects, according to various embodiments of the disclosure.
Figure 9:
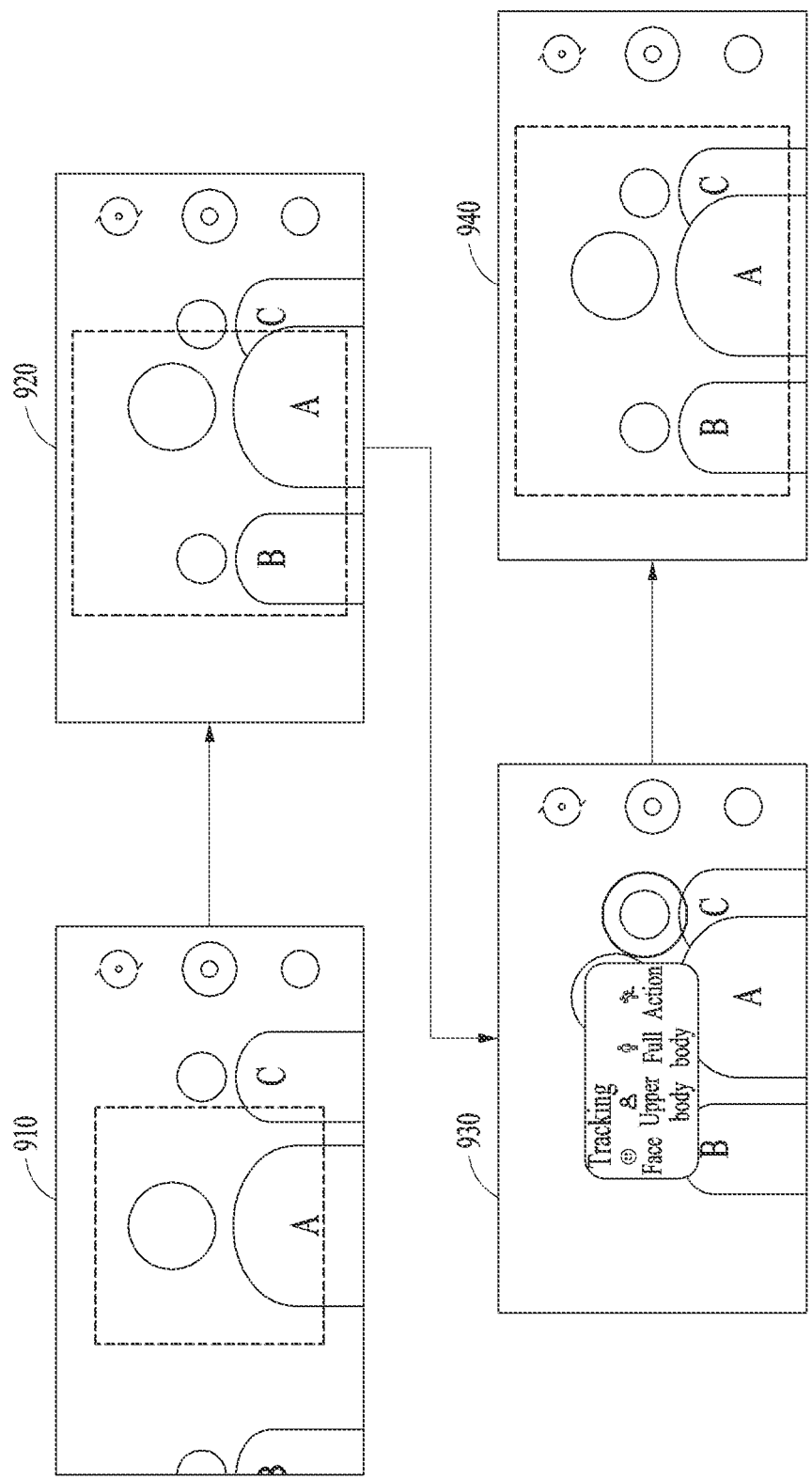

FIGS. 8 and 9 are diagrams each illustrating a framing operation using a plurality of sub-subjects, according to various embodiments of the disclosure.

Referring to FIG. 8, a target subject and framing options may be set through capturing screens 810, 820, and 830. When a message instructing to select a main subject and a sub-subject is exposed in an output image as shown in a first capturing screen 810, a user may select a first subject A as the main subject in a second capturing screen 820 and may set the framing options for the main subject. The user may select a second subject B as the sub-subject in a third capturing screen 830 and may set the framing options for the sub-subject. Hereinafter, the descriptions are provided under the assumption that a position option is set such that the first subject A is arranged in the center area of the output image and that the upper body of the first subject A and the upper body of the second subject B are set as a tracking area.

Referring to FIG. 9, composition centering the first subject A may be set when the second subject B escapes from the frame in a first capturing screen 910, and composition centering the first subject A and the second subject B may be set when the second subject B is back in the frame in a second capturing screen 920. For example, the composition may be set such that the upper body of the first subject A and the upper body of the second subject B may be in the center area of the output image. Although the position option is described as applied only to the main subject, the position option may be applied to both the main subject and the sub-subject depending on situations. In a third capturing screen 930, a third subject C may be selected as an additional sub-subject, and the framing options may be set for the sub-subject. Accordingly, the composition may be adjusted such that all the subjects A, B, and C may be arranged in the center of the screen as shown in a capturing screen 940.

Figure 10:
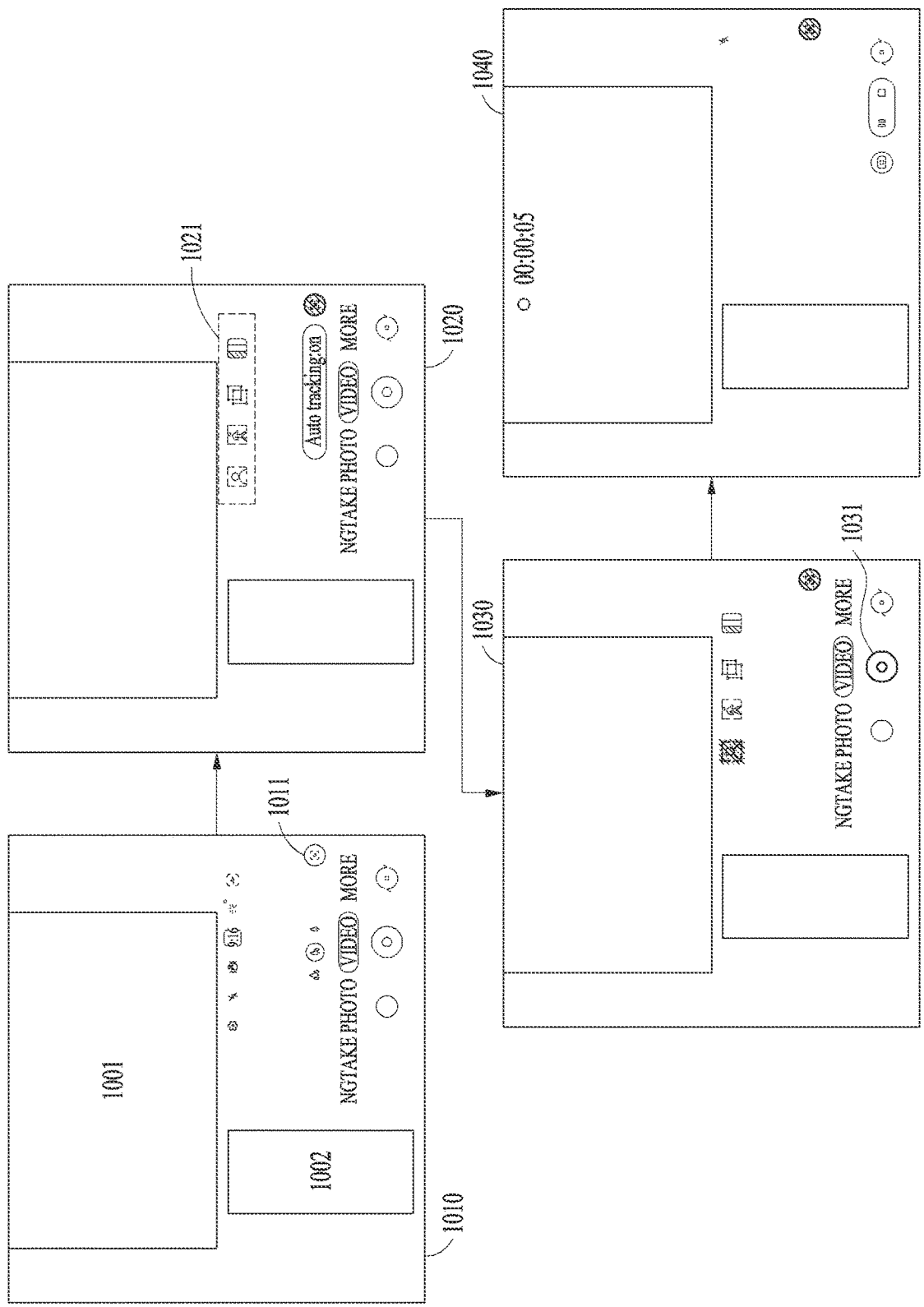
FIG. 10 is a diagram illustrating a screen of controlling framing, according to an embodiment of the disclosure.

FIG. 10 is a diagram illustrating a screen of controlling framing, according to an embodiment of the disclosure.

Referring to FIG. 10, capturing screens 1010, 1020, 1030, and 1040 of FIG. 10 may have layouts different from the capturing screens described above. For example, the capturing screens described above may be applied to a small screen device, and the capturing screens 1010, 1020, 1030, and 1040 of FIG. 10 may be applied to a big screen device. The small screen device may include smartphones of a popular phone factor, such as a bar, slide, or flip form, and the large screen device may include a foldable smartphone, a rollable smartphone, and a tablet device. A first sub-area 1001 may display an output screen, and a second sub-area 1002 may display an image stored in a gallery.

A user may activate a framing operation of a photographing control device by selecting an automatic framing button 1011 of a first capturing screen 1010. The first capturing screen 1010 may further include a setting button, a flash button, an angle-of-view setting button, a mode (e.g., a photo capturing mode or a video capturing mode) selection button, besides the automatic framing button 1011. When the framing operation is activated, the automatic framing button 1011 may be emphasized as shown in a second capturing screen 1020, and a framing option menu 1021 may be displayed. The framing option menu 1021 may include a tracking option and a position option. Although the second capturing screen 1020 displays a face tracking option, a full body tracking option, a custom tracking option, and a left arrangement option, other options may be further displayed. For example, the user may select the face tracking option, and accordingly a message indicating that automatic tracking is on may be displayed. In addition, a button of a selected option may be emphasized as shown in a third capturing screen 1030. When the user selects a recording button 1031, recording may be started as shown in a fourth capturing screen 1040.

Figure 11:
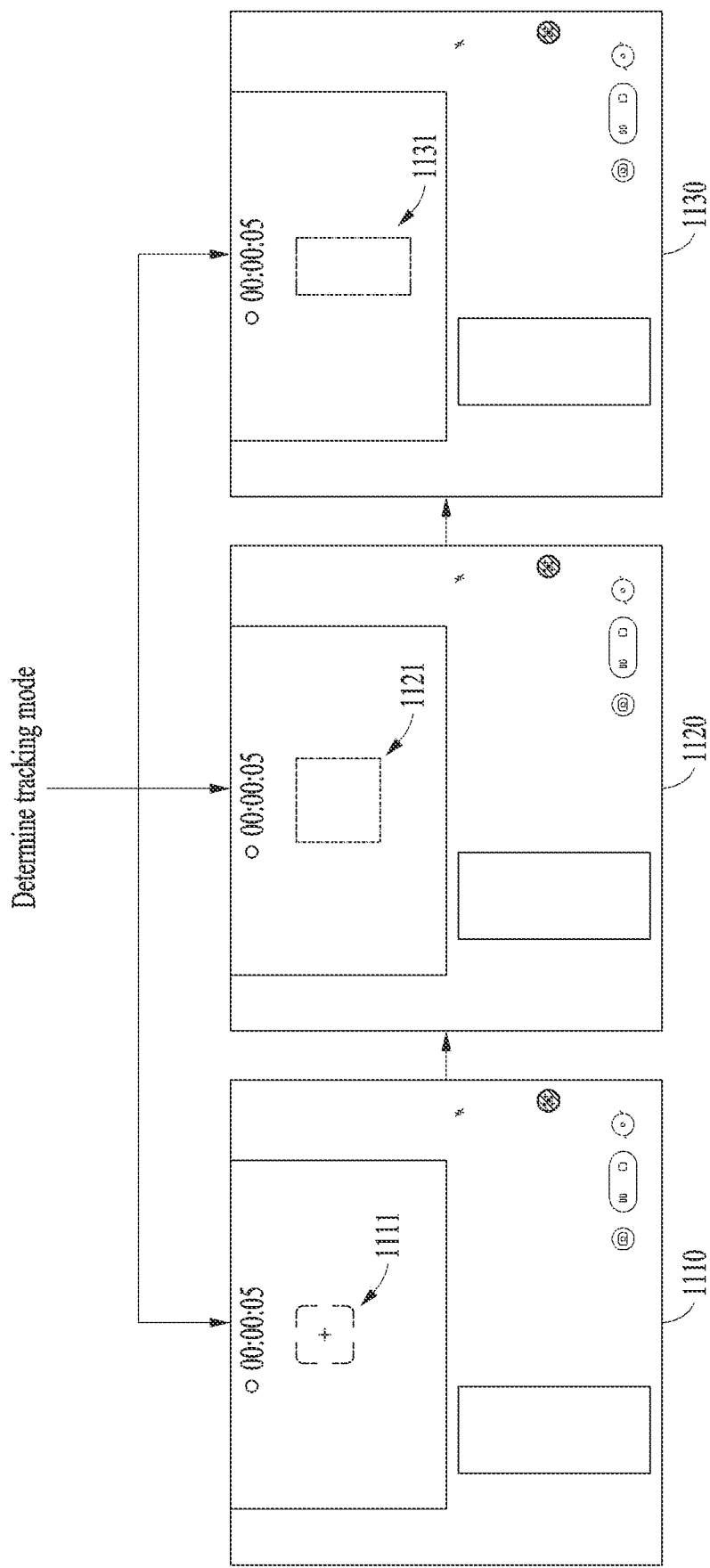
FIG. 11 is a diagram illustrating a tracking box by each tracking option, according to an embodiment of the disclosure.

FIG. 11 is a diagram illustrating a tracking box by each tracking option, according to an embodiment of the disclosure.

Referring to FIG. 11, a framing option may include a tracking option for determining a tracking area of a target subject. The tracking option may include a face tracking option, an upper body tracking option, a full body tracking option, and a custom tracking option depending on a part that is set as the tracking area. These option items are just examples, and other items may be added or some of them may be omitted. When the tracking option is set, the tracking box of a different shape may be displayed according to a current tracking option. For example, a first tracking box 1111 of a first capturing screen 1110 is used for face tracking, a second tracking box 1121 of a second capturing screen 1120 may be used for full body tracking, and a third tracking box 1131 of a third capturing screen 1130 may be used for custom tracking. When the user taps capturing screens 1110, 1120, and 1130, tracking boxes 1111, 1121, and 1131 may be hidden or weakly (e.g., thinly, blurredly, or highly transparently) displayed.

Figure 12:
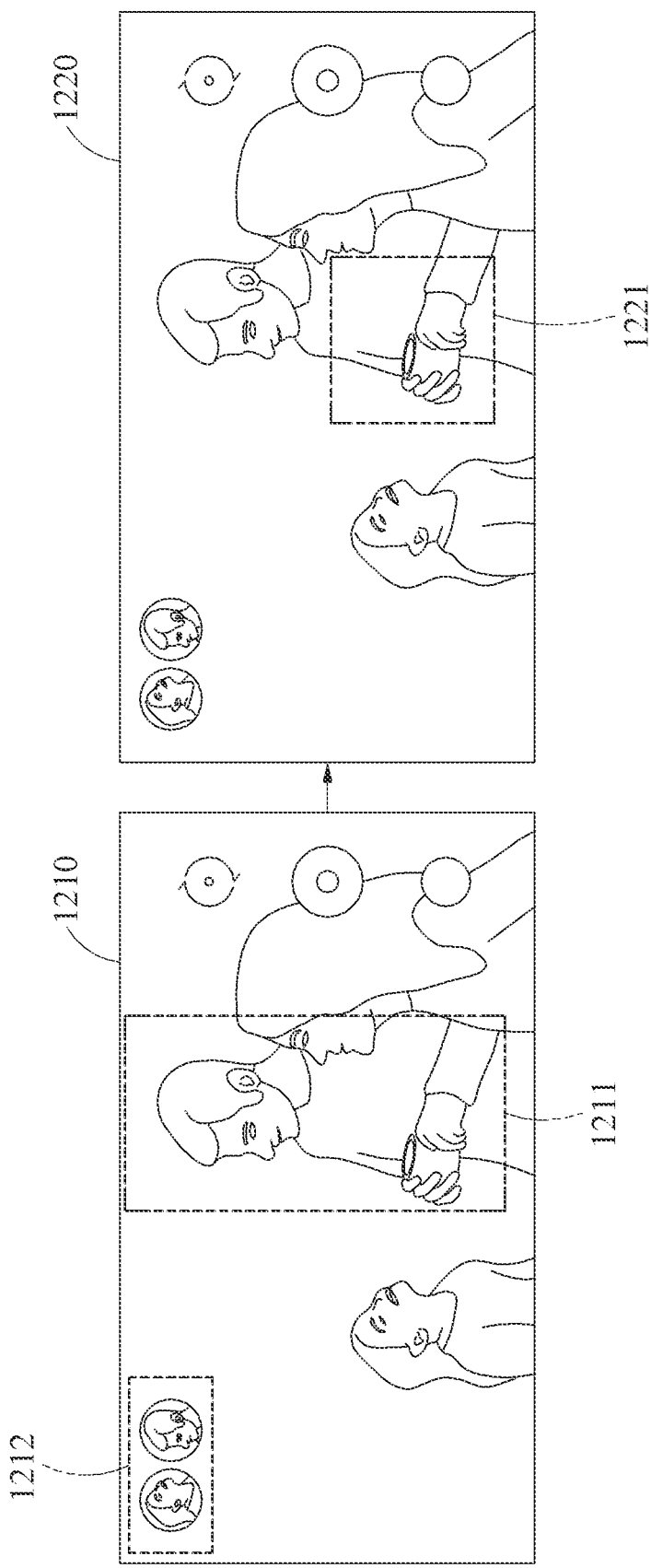
FIG. 12 is a diagram illustrating a framing operation using a change of a tracking box, according to an embodiment of the disclosure.

FIG. 12 is a diagram illustrating a framing operation using a change of a tracking box, according to an embodiment of the disclosure.

Referring to FIG. 12, a tracking box 1211 of a first capturing screen 1210 may be for custom tracking, and an area 1212 may represents current target subjects. A user may set a tracking target by freely adjusting the tracking box 1211. For example, the user adjusts the size of the tracking box 1211 by dragging each corner of the tracking box 1211, and the tracking box 1211 may move the tracking box 1211 by dragging the center area of the tracking box 1211. For example, the user adjusts the tracking box 1211 of the first capturing screen 1210, like a tracking box 1221 of a second capturing screen 1220. In this case, a photographing control device may recognize hands in the tracking box 1221 as the tracking target and perform tracking centered on the hands.

Figure 13:
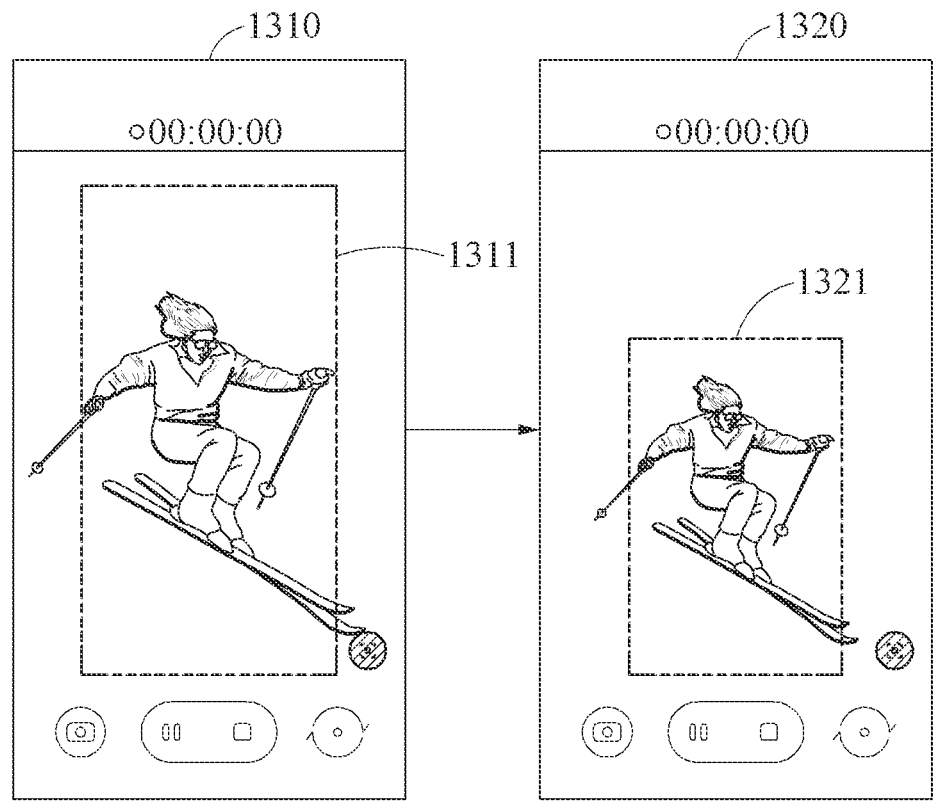
FIG. 13 is a diagram illustrating a framing operation in an action situation, according to an embodiment of the disclosure.

FIG. 13 is a diagram illustrating a framing operation in an action situation, according to an embodiment of the disclosure.

Referring to FIG. 13, when capturing leisure activities, such as bicycle riding, skiing, snowboarding, or surfing, a tracking box may be set for an area related to the leisure activities through a custom tracking option. For example, a tracking box 1311 is set for an area including expedition gear as shown in a first capturing screen 1310, and a photographing control device tracks a person or the gear recognized in the tracking box. In this case, the photographing control device may insert various effects into an output image such that the leisure activities may be more dynamically captured.

For example, the photographing control device adjusts composition by repeating the extension and contraction of a target subject. Accordingly, the composition of a wider angle of view may be applied to a second capturing screen 1320 compared to the first capturing screen 1310. Although a tracking box 1321 is displayed smaller than the tracking box 1311 as the angle of view widens, the tracking box 1311 of the first capturing screen 1310 may be maintained at the same size as the tracking box 1321 of the second capturing screen 1320.

For another example, the photographing control device emphasizes sound related to the leisure activities of a subject and may insert the emphasized sound into the output image. More specifically, the photographing control device may generate the output image by adjusting the degree of ambient sound reflected on the output image, based on the relevance between ambient sound corresponding to an input image and a main subject. For example, the photographing control device determines that the relevance with the main subject is higher as the ambient sound is closer to a sound heard at the beginning of the recording of the output image. For example, a sound of dividing snow is heard at the beginning of the recording of a skiing video, a sound of dividing water may be heard at the beginning of the recording of a wakeboarding video, and the photographing control device determines that a sound like those sounds have high relevance with the main subject. In addition, the photographing control device may determine that the relevance is higher as the ambient sound is farther from noise. The photographing control device may collect a sound by controlling a reception direction of a directional microphone to be consistent with a capturing direction. Artificial intelligence (AI) may be used to determine relevance.

Figure 14:
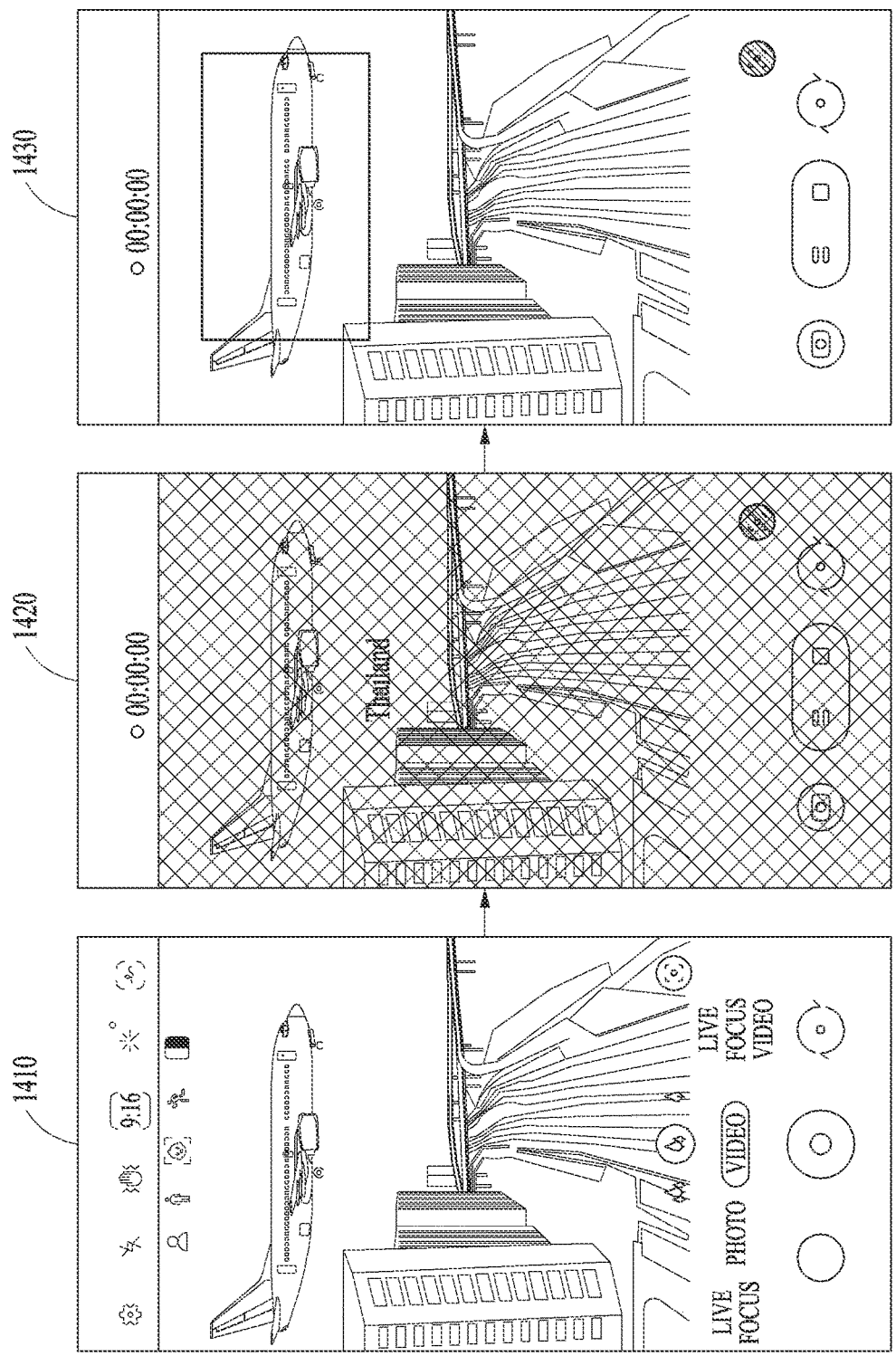
FIG. 14 is a diagram illustrating an operation of applying a visual effect to an image, according to an embodiment of the disclosure.

FIG. 14 is a diagram illustrating an operation of applying a visual effect to an image, according to an embodiment of the disclosure.

Referring to FIG. 14, when a user presses a recording button while a first capturing screen 1410 is displayed, recording may be started. When recording is started, an output image is recorded, and a recorded image may be generated. In this case, a photographing control device may generate the recorded image by inserting various visual effects into the output image through image analysis. For example, the photographing control device obtains main keyword information by using location information, may derive a keyword from at least one subject included in the output image by analyzing the output image, and inserts a watermark corresponding to the derived keyword into the output image. The photographing control device may recognize that an airplane, building, and road of the first capturing screen 1410 are in Thailand and may insert the watermark "Thailand" at the beginning of an image when recording starts as shown in a second capturing screen 1420. In addition, the photographing control device may insert a shade, bokeh, blur, and other visual effects. The visual effects may be removed after a certain time as shown in a third capturing screen 1430.

Figure 15:
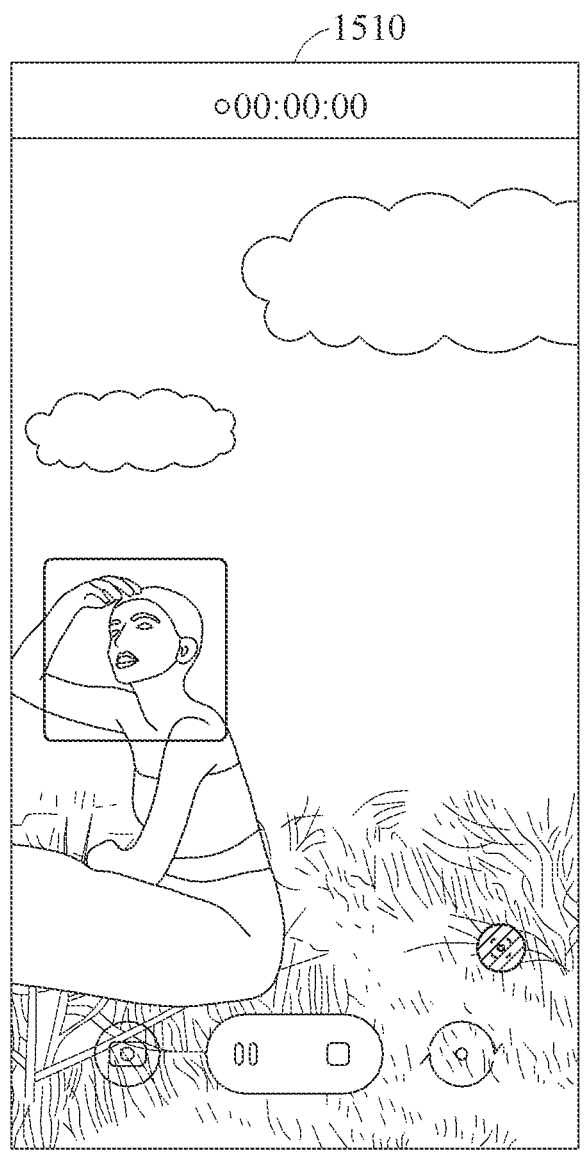
FIG. 15 is a diagram illustrating a framing operation using harmony between a person and a background, according to an embodiment of the disclosure.

FIG. 15 is a diagram illustrating a framing operation using the harmony between a person and a background, according to an embodiment of the disclosure.

Referring to FIG. 15, a photographing control device may automatically apply optimal composition suitable for a situation. For example, there is a database storing the optimal composition suitable for a situation, and the photographing control device recognizes a current situation through image analysis, extracts the optimal composition suitable for the situation from the database, and applies it to photography composition. For example, in a scene including a person and a background, the composition of arranging the person in the lower left corner is stored as the optimal composition, and the photographing control device may apply the optimal composition to a capturing screen 1510 when the person and the background is recognized in an input image.

Figure 16:
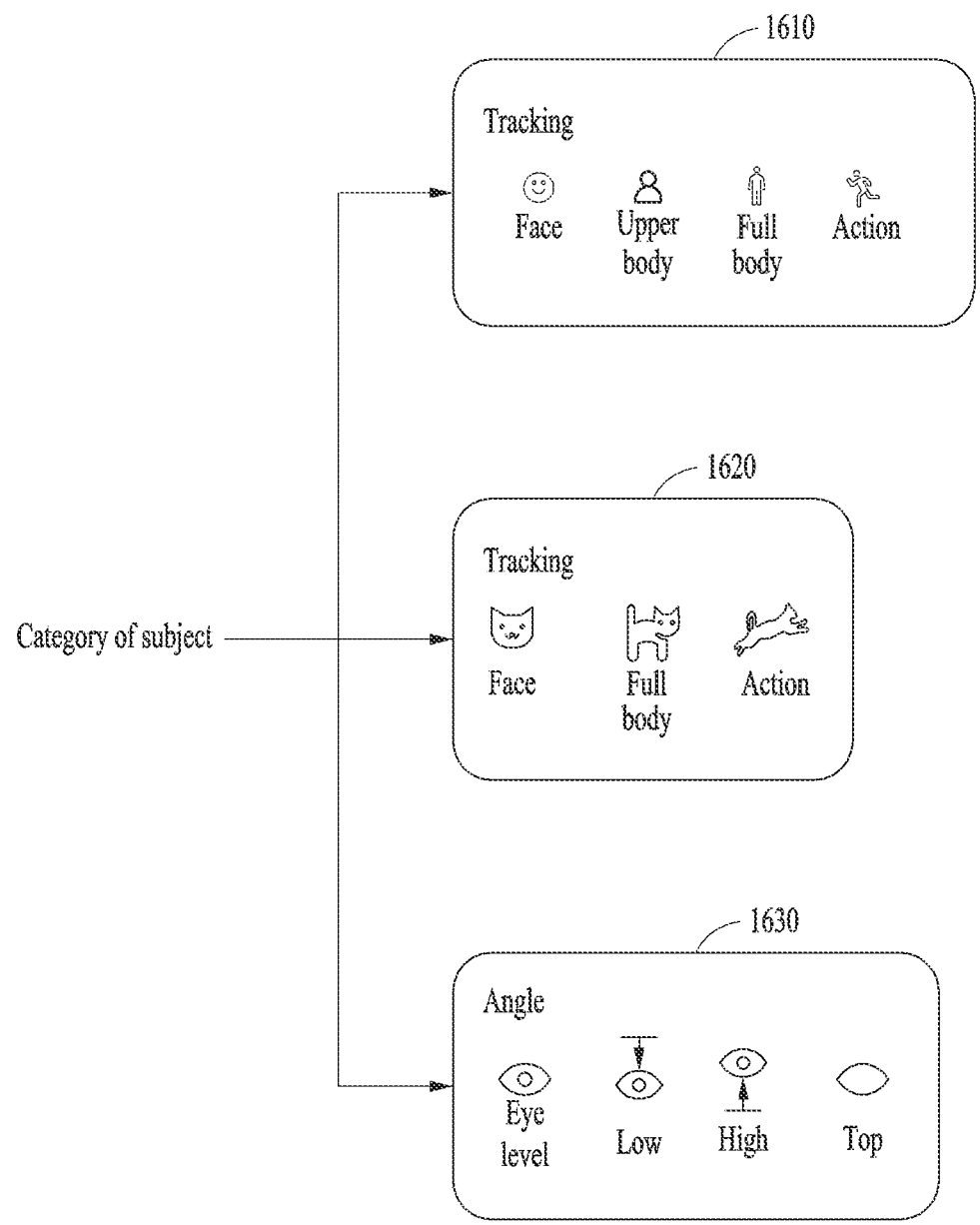
FIG. 16 is a diagram illustrating a tracking option by each category of a subject, according to an embodiment of the disclosure.

FIG. 16 is a diagram illustrating a tracking option by each category of a subject, according to an embodiment of the disclosure.

Referring to FIG. 16, a tracking area of a target subject may be set by the tracking option, and the tracking option may be determined according to a category of a subject. For example, when the category of the target subject is a person, a first item set 1610 is provided, and when the category of the target subject is an animal, a second item set 1620 may be provided. When capturing an animal, the need for capturing an upper body may decrease. When the target subject is an object, an angle option, such as a third item set 1630, may be provided instead of the tracking option since the object does not move. For example, the angle option includes at least one of an eye level angle, a low angle, a high angle, and a top view.

Figure 17:
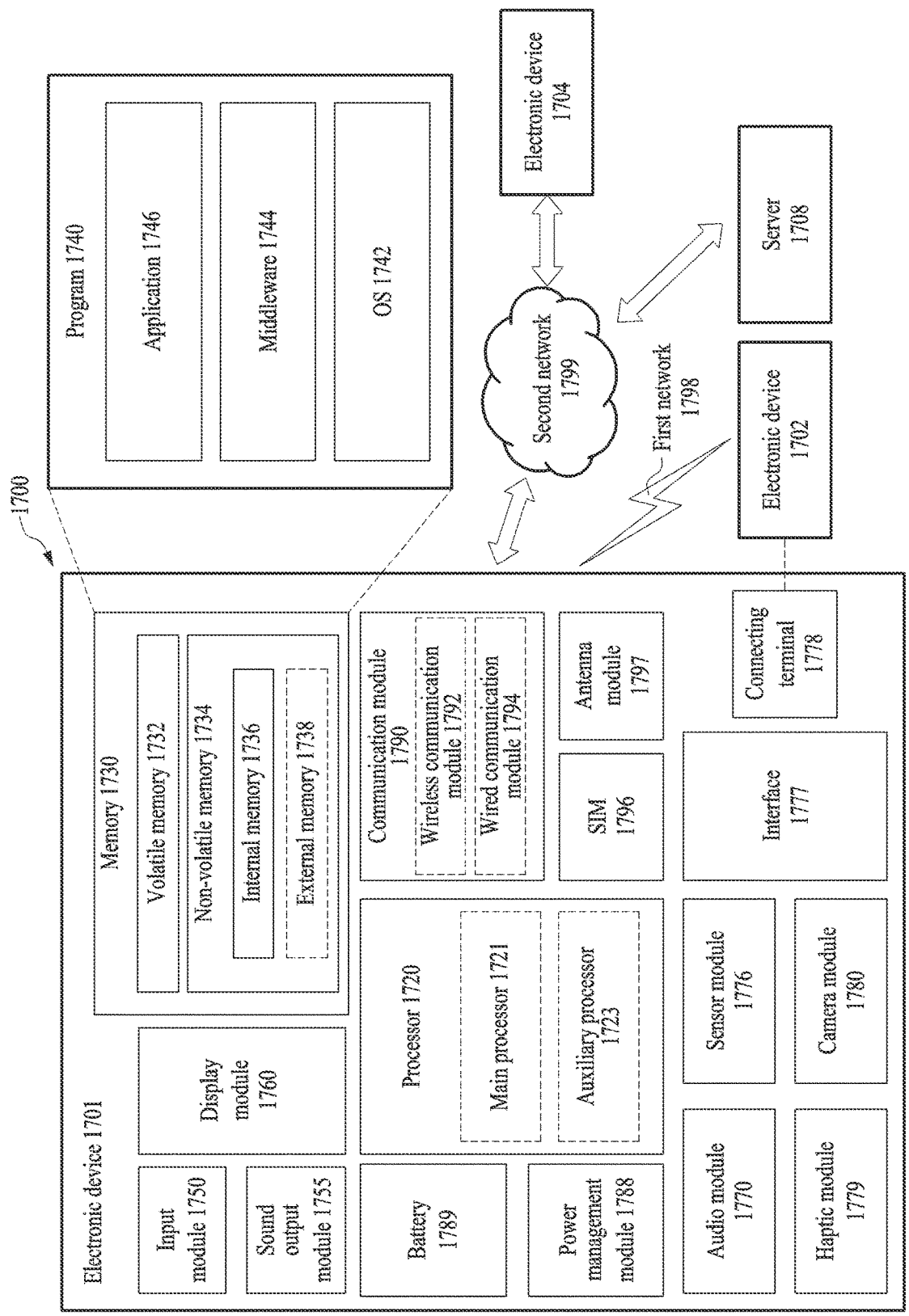
FIG. 17 is a diagram illustrating an electronic device in a network environment, according to an embodiment of the disclosure.

FIG. 17 is a diagram illustrating an electronic device in a network environment, according to an embodiment of the disclosure.

Referring to FIG. 17, an electronic device 1701 in a network environment 1700 may communicate with an electronic device 1702 via a first network 1798 (e.g., a short-range wireless communication network) or may communicate with at least one of an electronic device 1704 or a server 1708 via a second network 1799 (e.g., a long-range wireless communication network). According to an embodiment, the electronic device 1701 may communicate with the electronic device 1704 via the server 1708. According to an embodiment, the electronic device 1701 may include a processor 1720, a memory 1730, an input module 1750, a sound output module 1755, a display module 1760, an audio module 1770, a sensor module 1776, an interface 1777, a connecting terminal 1778, a haptic module 1779, a camera module 1780, a power management module 1788, a battery 1789, a communication module 1790, a subscriber identification module (SIM) 1796, or an antenna module 1797. In an embodiment, at least one of the components (e.g., the connecting terminal 1778) may be omitted from the electronic device 1701, or one or more other components may be added to the electronic device 1701. In an embodiment, some of the components (e.g., the sensor module 1776, the camera module 1780, or the antenna module 1797) may be integrated as a single component (e.g., the display module 1760).

The processor 1720 may execute, for example, software (e.g., a program 1740) to control at least one other component (e.g., a hardware or software component) of the electronic device 1701 connected to the processor 1720 and may perform various types of data processing or computation. According to an embodiment, as at least a part of data processing or computation, the processor 1720 may store a command or data received from another component (e.g., the sensor module 1776 or the communication module 1790) in a volatile memory 1732, may process the command or the data stored in the volatile memory 1732, and may store resulting data in a non-volatile memory 1734. According to an embodiment, the processor 1720 may include the main processor 1721 (e.g., a central processing unit (CPU) or an access point (AP)), or an auxiliary processor 1723 (e.g., a graphics processing unit (GPU), a neural processing unit (NPU), an image signal processor (ISP), a sensor hub processor, or a co-processor (CP)) that is operable independently from, or in conjunction with the main processor 1721. For example, when the electronic device 1701 includes the main processor 1721 and the auxiliary processor 1723, the auxiliary processor 1723 is adapted to consume less power than the main processor 1721 or to be specific to a specified function. The auxiliary processor 1723 may be implemented separately from the main processor 1721 or as a part of the main processor 1721.

The auxiliary processor 1723 may control at least some of functions or states related to at least one (e.g., the display module 1760, the sensor module 1776, or the communication module 1790) of the components of the electronic device 1701, instead of the main processor 1721 while the main processor 1721 is in an inactive (e.g., sleep) state or together with the main processor 1721 while the main processor 1721 is in an active state (e.g., executing an application). According to an embodiment, the auxiliary processor 1723 (e.g., an ISP or a CP) may be implemented as a portion of another component (e.g., the camera module 1780 or the communication module 1790) that is functionally related to the auxiliary processor 1723. According to an embodiment, the auxiliary processor 1723 (e.g., an NPU) may include a hardware structure specifically for AI model processing. An AI model may be generated by machine learning. Such learning may be performed by, for example, the electronic device 1701 in which AI is performed or performed via a separate server (e.g., the server 1708). A learning algorithm may include, but is not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The processor 1720 may execute instructions to perform the operations described herein with reference to FIGS. 1 to 16 and 18 to 20. The processor 1720 may determine a main subject among the at least one subject of an input image, may set a position option for determining an arrangement in an output image of the main subject, may set a main tracking option for determining a main tracking area of the main subject, and may generate the output image having composition satisfying the position option and the main tracking option, based on the input image. The processor 1720 may determine a sub-subject among the at least one subject, may set a sub-tracking option for determining a sub-tracking area of the sub-subject, and may adjust composition according to the position option, the main tracking option, and the sub-tracking option.

The memory 1730 may store various pieces of data used by at least one component (e.g., the processor 1720 or the sensor module 1776) of the electronic device 1701. The various pieces of data may include, for example, software (e.g., the program 1740) and input data or output data for a command related thereto. The memory 1730 may include the volatile memory 1732 or the non-volatile memory 1734.

The program 1740 may be stored as software in the memory 1730, and may include, for example, an operating system (OS) 1742, middleware 1744, or an application 1746.

The input module 1750 may receive a command or data to be used by another component (e.g., the processor 1720) of the electronic device 1701, from the outside (e.g., a user) of the electronic device 1701. The input module 1750 may include, for example, a microphone, a mouse, a keyboard, a key (e.g., a button), or a digital pen (e.g., a stylus pen).

The sound output module 1755 may output a sound signal to the outside of the electronic device 1701. The sound output module 1755 may include, for example, a speaker or a receiver. The speaker may be used for general purposes, such as playing multimedia or playing record. The receiver may be used to receive an incoming call. According to an embodiment, the receiver may be implemented separately from the speaker or as a portion of the speaker.

The display module 1760 may visually provide information to the outside (e.g., the user) of the electronic device 1701. The display module 1760 may include, for example, a display, a hologram device, or a projector and control circuitry to control a corresponding one of the display, the hologram device, and the projector. According to an embodiment, the display module 1760 may include a touch sensor adapted to sense a touch, or a pressure sensor adapted to measure an intensity of a force incurred by the touch.

The audio module 1770 may convert a sound into an electric signal and vice versa. According to an embodiment, the audio module 1770 may obtain the sound via the input module 1750 or may output the sound via the sound output module 1755 or an external electronic device (e.g., the electronic device 1702 such as a speaker or a headphone) directly or wirelessly connected to the electronic device 1701.

The sensor module 1776 may detect an operational state (e.g., power or temperature) of the electronic device 1701 or an environmental state (e.g., a state of a user) external to the electronic device 1701 and may generate an electrical signal or data value corresponding to the detected state. According to an embodiment, the sensor module 1776 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1777 may support one or more specified protocols to be used for the electronic device 1701 to be coupled with the external electronic device (e.g., the electronic device 1702) directly or wirelessly. According to an embodiment, the interface 1777 may include, for example, a high-definition multimedia interface (HDMI), a universal serial bus (USB) interface, a secure digital (SD) card interface, or an audio interface.

The connecting terminal 1778 may include a connector via which the electronic device 1701 may be physically connected to an external electronic device (e.g., the electronic device 1702). According to an embodiment, the connecting terminal 1778 may include, for example, an HDMI connector, a USB connector, an SD card connector, or an audio connector (e.g., a headphone connector).

The haptic module 1779 may convert an electrical signal into a mechanical stimulus (e.g., a vibration or a movement) or an electrical stimulus which may be recognized by a user via his or her tactile sensation or kinesthetic sensation. According to an embodiment, the haptic module 1779 may include, for example, a motor, a piezoelectric element, or an electric stimulator.

The camera module 1780 may capture a still image and a moving image including at least one subject. An image captured by the camera module 1780 may be used as an input image of a photographing control device and/or the processor 1720. According to an embodiment, the camera module 1780 may include one or more lenses, image sensors, ISPs, or flashes.

The power management module 1788 may manage power supplied to the electronic device 1701. According to an embodiment, the power management module 1788 may be implemented as, for example, at least a part of a power management integrated circuit (PMIC).

The battery 1789 may supply power to at least one component of the electronic device 1701. According to an embodiment, the battery 1789 may include, for example, a primary cell which is not rechargeable, a secondary cell which is rechargeable, or a fuel cell.

The communication module 1790 may support establishing a direct (e.g., wired) communication channel or a wireless communication channel between the electronic device 1701 and the external electronic device (e.g., the electronic device 1702, the electronic device 1704, or the server 1708) and performing communication via the established communication channel. The communication module 1790 may include one or more communication processors that operate independently of the processor 1720 (e.g., an application processor) and support direct (e.g., wired) communication or wireless communication. According to an embodiment, the communication module 1790 may include a wireless communication module 1792 (e.g., a cellular communication module, a short-range wireless communication module, or a global navigation satellite system (GNSS) communication module) or a wired communication module 1794 (e.g., a local area network (LAN) communication module, or a power line communication (PLC) module). A corresponding one of these communication modules may communicate with the external electronic device 1704 via the first network 1798 (e.g., a short-range communication network, such as Bluetooth™, wireless-fidelity (Wi-Fi) direct, or infrared data association (IrDA)) or the second network 1799 (e.g., a long-range communication network, such as a legacy cellular network, a fifth-generation (5G) network, a next-generation communication network, the Internet, or a computer network (e.g., a LAN or a wide area network (WAN))). These various types of communication modules may be implemented as a single component (e.g., a single chip) or may be implemented as multiple components (e.g., multiple chips) separate from each other. The wireless communication module 1792 may identify and authenticate the electronic device 1701 in a communication network, such as the first network 1798 or the second network 1799, by using subscriber information (e.g., international mobile subscriber identity (IMSI)) stored in the SIM 1796.

The wireless communication module 1792 may support a 5G network after a fourth-generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1792 may support a high-frequency band (e.g., a mmWave band) to achieve, e.g., a high data transmission rate. The wireless communication module 1792 may support various technologies for securing performance on a high-frequency band, such as, e.g., beamforming, massive multiple-input and multiple-output (MIMO), full dimensional MIMO (FD-MIMO), an array antenna, analog beamforming, or a large-scale antenna. The wireless communication module 1792 may support various requirements specified in the electronic device 1701, an external electronic device (e.g., the electronic device 1704), or a network system (e.g., the second network 1799). According to an embodiment, the wireless communication module 1792 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1797 may transmit or receive a signal or power to or from the outside (e.g., an external electronic device) of the electronic device 1701. According to an embodiment, the antenna module 1797 may include an antenna including a radiating element including a conductive material or a conductive pattern formed in or on a substrate (e.g., a printed circuit board (PCB)). According to an embodiment, the antenna module 1797 may include a plurality of antennas (e.g., array antennas). In such a case, at least one antenna appropriate for a communication scheme used in a communication network, such as the first network 1798 or the second network 1799, may be selected by, for example, the communication module 1790 from the plurality of antennas. The signal or power may be transmitted or received between the communication module 1790 and the external electronic device via the at least one selected antenna. According to an embodiment, another component (e.g., a radio frequency integrated circuit (RFIC)) other than the radiating element may be additionally formed as a part of the antenna module 1797.

According to various embodiments, the antenna module 1797 may form a mmWave antenna module. According to an embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1701 and the external electronic device 1704 via the server 1708 coupled with the second network 1799. Each of the external electronic devices 1702 or 1704 may be a device of the same type as or a different type from the electronic device 1701. According to an embodiment, all or some of operations to be executed by the electronic device 1701 may be executed at one or more external electronic devices (e.g., the external electronic devices 1702 and 1704, and the server 1708). For example, if the electronic device 1701 needs to perform a function or a service automatically, or in response to a request from a user or another device, the electronic device 1701, instead of, or in addition to, executing the function or the service, requests one or more external electronic devices to perform at least part of the function or the service. The one or more external electronic devices receiving the request may perform the at least part of the function or the service requested, or an additional function or an additional service related to the request and may transfer an outcome of the performing to the electronic device 1701. The electronic device 1701 may provide the outcome, with or without further processing of the outcome, as at least part of a reply to the request. To that end, a cloud computing, distributed computing, mobile edge computing (MEC), or client-server computing technology may be used, for example. The electronic device 1701 may provide ultra-low-latency services using, e.g., distributed computing or MEC. In an example, the external electronic device 1704 may include an Internet-of-things (IoT) device. The server 1708 may be an intelligent server using machine learning and/or a neural network. According to an embodiment, the external electronic device 1704 or the server 1708 may be included in the second network 1799. The electronic device 1701 may be applied to intelligent services (e.g., a smart home, a smart city, a smart car, or healthcare) based on 5G communication technology or IoT-related technology. In addition, the descriptions of FIGS. 1 to 16 and 18 to 20 may also apply to the electronic device 1701.

Figure 18:
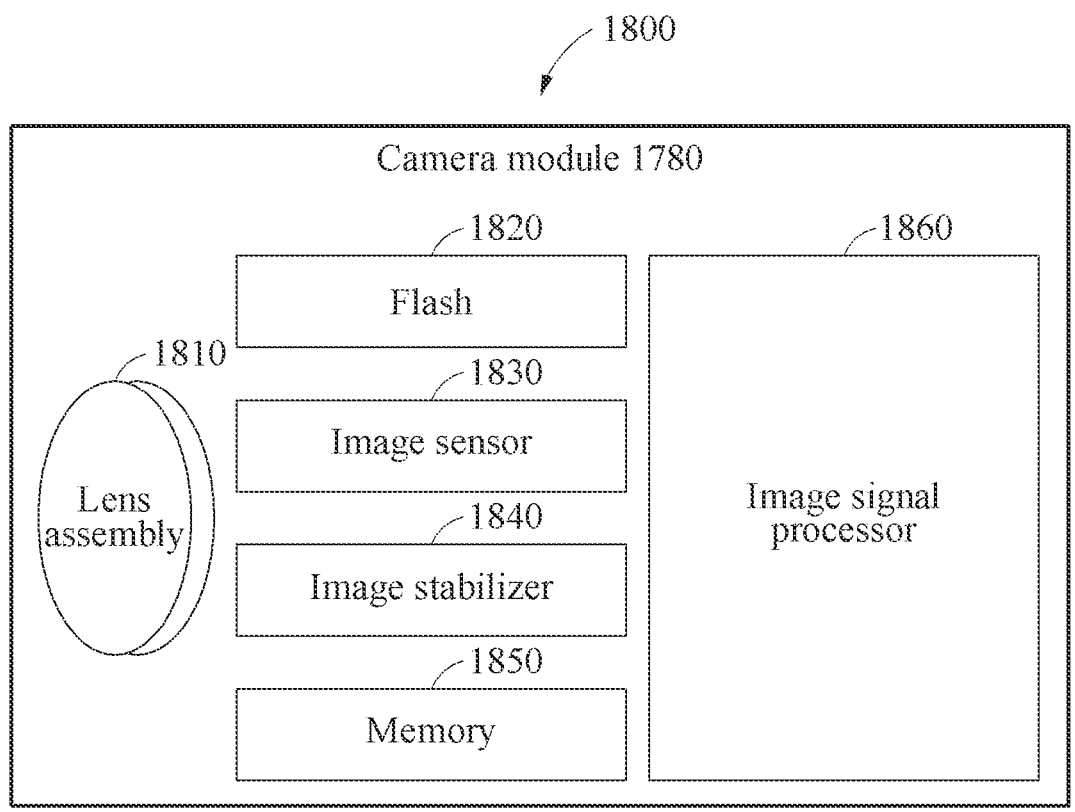
FIG. 18 is a diagram illustrating a camera module according to an embodiment of the disclosure.

FIG. 18 is a diagram illustrating a camera module according to an embodiment of the disclosure.

Referring to FIG. 18, a camera module 1780 may include a lens assembly 1810, a flash 1820, an image sensor 1830, an image stabilizer 1840, a memory 1850 (e.g., a buffer memory), or an image signal processor (ISP) 1860. The lens assembly 1810 may collect light emitted from a subject of which an image is to be captured. The lens assembly 1810 may include one or more lenses. According to an embodiment, the camera module 1780 may include a plurality of lens assemblies 1810. In this case, the camera module 1780 may form, for example, a dual camera, a 360-degree camera, or a spherical camera. Some of the lens assemblies 1810 may have the same lens properties (e.g., an angle of view, a focal length, an auto focus, an f number, or an optical zoom), or at least one of the lens assemblies 1810 may have one or more lens properties that are different from those of other lens assemblies. The lens assembly 1810 may include, for example, a wide-angle lens or a telephoto lens.

The flash 1820 may emit light that is used to reinforce light emitted or reflected from a subject. According to an embodiment, the flash 1820 may include one or more light-emitting diodes (LEDs) (e.g., a red-green-blue (RGB) LED, a white LED, an infrared (IR) LED, or an ultraviolet (UV) LED), or a xenon lamp. The image sensor 1830 may obtain an image corresponding to the subject by converting light emitted or reflected from the subject and transmitted through the lens assembly 1810 into an electrical signal. According to an embodiment, the image sensor 1830 may include, for example, one image sensor selected from among image sensors having different properties, such as, for example, an RGB sensor, a black and white (BW) sensor, an IR sensor, or a UV sensor, a plurality of image sensors having the same property, or a plurality of image sensors having different properties. Each image sensor included in the image sensor 1830 may be implemented using, for example, a charged coupled device (CCD) sensor or a complementary metal-oxide-semiconductor (CMOS) sensor.

The image stabilizer 1840 may move at least one lens included in the lens assembly 1810 or the image sensor 1830 in a specific direction or may control an operation characteristic of the image sensor 1830 in response to a movement of the camera module 1780 or the electronic device 1701 including the camera module 1780. For example, the image stabilizer 1840 adjusts read-out timing. This may compensate for at least some of a negative effect of the movement on an image to be captured. According to an embodiment, the image stabilizer 1840 may sense such a movement of the camera module 1780 or the electronic device 1701 by using a gyro sensor (not shown) or an acceleration sensor (not shown) that is inside or outside the camera module 1780. According to an embodiment, the image stabilizer 1840 may be implemented as, for example, an optical image stabilizer. The memory 1850 may at least temporarily store at least a portion of an image obtained through the image sensor 1830 for a subsequent image processing task. For example, when image acquisition is delayed by a shutter or a plurality of images is obtained at a high speed, an obtained original image (e.g., a Bayer-patterned image or a high-resolution image) is stored in the memory 1850 and a copy image (e.g., a low-resolution image) corresponding the original image may be previewed through the display module 1760. Subsequently, when a specified condition (e.g., a user input or a system command) is satisfied, at least a portion of the original image stored in the memory 1850 may be obtained and processed by, for example, the ISP 1860. According to an embodiment, the memory 1850 may be configured as at least part of the memory 1730 or as a separate memory operated independently of the memory 1730.

The ISP 1860 may perform one or more image processing operations on an image obtained via the image sensor 1830 or an image stored in the memory 1850. The image processing operations may include, for example, depth map generation, three-dimensional (3D) modeling, panorama generation, feature point extraction, image synthesis, or image compensation (e.g., noise reduction, resolution adjustment, brightness adjustment, blurring, sharpening, or softening). Additionally or alternatively, the ISP 1860 may control at least one of the components (e.g., the image sensor 1830) included in the camera module 1780. For example, the ISP 1860 controls an exposure time, read-out timing, and the like. The image processed by the ISP 1860 may be stored again in the memory 1850 for further processing or may be provided to an external component (e.g., the memory 1730, the display module 1760, the electronic device 1702, the electronic device 1704, or the server 1708) of the camera module 1780. According to an embodiment, the ISP 1860 may be configured as at least part of the processor 1720 or as a separate processor operated independently of the processor 1720. When the ISP 1860 is configured as a processor separate from the processor 1720, at least one image processed by the ISP 1860 may be displayed as it is without a change or may be displayed through the display module 1760 after additional image processing is performed by the processor 1720.

According to an embodiment, the electronic device 1701 may include a plurality of camera modules 1800 having different properties or functions. In this case, for example, at least one of the camera modules 1780 may be a wide-angle camera, and at least another one of the camera modules 1780 may be a telephoto camera. Similarly, at least one of the camera modules 1780 may be a front camera, and at least another one of the camera modules 1780 may be a rear camera.

Figure 19:
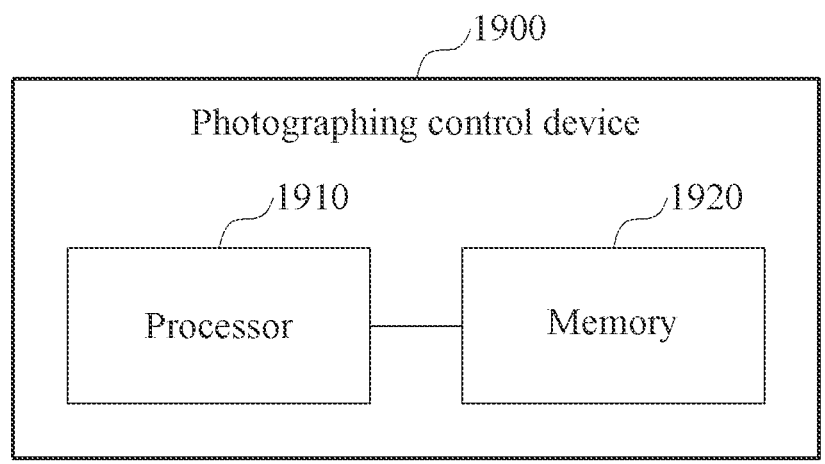
FIG. 19 is a diagram illustrating a photographing control device according to an embodiment of the disclosure.

FIG. 19 is a diagram illustrating a photographing control device according to an embodiment of the disclosure.

Referring to FIG. 19, a photographing control device 1900 includes a processor 1910 and a memory 1920. At least a portion of the photographing control device 1900, the processor 1910, and the memory 1920 may be structurally and/or functionally included in at least a portion of the electronic device 1701 of FIG. 17.

The memory 1920 may be connected to the processor 1910 and may store instructions executable by the processor 1910, data to be operated by the processor 1910, or data processed by the processor 1910. When the instructions are executed in the processor 1910, the processor 1910 may execute the instructions for performing the operations of FIGS. 1 to 18 and 20.

The processor 1910 may determine a main subject among at least one subject of an input image, may set a position option for determining an arrangement in an output image of the main subject, and may generate the output image satisfying the position option, based on the input image. The processor 1910 may determine a sub-subject among the at least one subject, may set a main tracking option for determining a main tracking area of the main subject and a sub-tracking option for determining a sub-tracking area of the sub-subject, and may adjust composition according to the position option, the main tracking option, and the sub-tracking option. The processor 1910 may adjust the composition based on at least one of camera control and the post-processing of the input image. In addition, the descriptions of FIGS. 1 to 18 and 20 may also apply to the photographing control device 1900.

Figure 20:
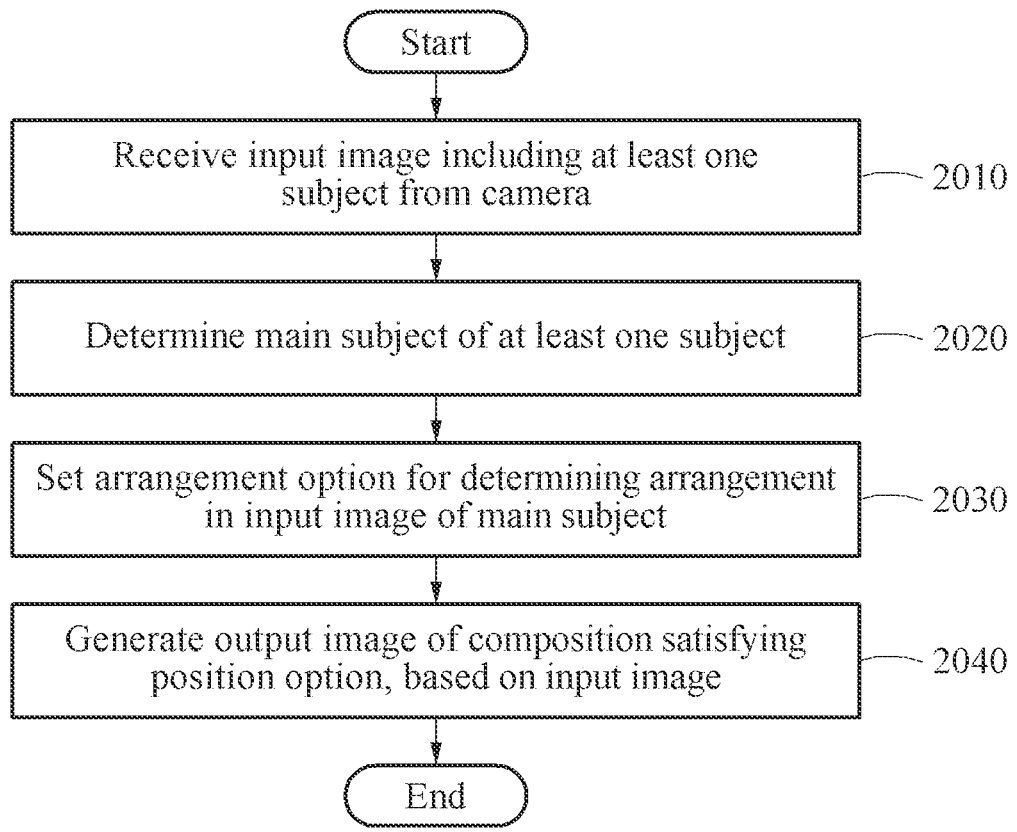
FIG. 20 is a diagram illustrating a photographing control method according to an embodiment of the disclosure.

FIG. 20 is a diagram illustrating a photographing control method according to an embodiment of the disclosure.

Referring to FIG. 20, the photographing control method includes operation 2010 of receiving an input image including at least one subject from a camera, operation 2020 of determining a main subject among the at least one subject, operation 2030 of setting a position option for determining an arrangement in an output image of the main subject, and operation 2040 of generating the output image having composition satisfying the position option, based on the input image. The position option may include at least one of a first position option, a second position option, and a third position option, in which the first position option arranges the main subject in the left area of the output image, the second position option arranges the main subject in the center area of the output image, and the third position option arranges the main subject in the right area of the output image.

The photographing control method may further include an operation of setting a tracking option for determining a tracking area of the main subject, and operation 2040 may include an operation of adjusting the composition according to the position option and the tracking option. The tracking option may include at least one of a first tracking option, a second tracking option, a third tracking option, and a fourth tracking option, in which the first tracking option tracks a face of the main subject, the second tracking option tracks the upper body of the main subject, the third tracking option tracks the full body of the main subject, and the fourth tracking option tracks a custom region defined for the main subject. Operation 2040 may include an operation of adjusting the composition by repeating the extension and contraction of the main subject when the fourth tracking option is selected. The tracking option may have different items depending on a category of the main subject.

The photographing control method may further include an operation of determining a sub-subject among the at least one subject. The photographing control method may further include an operation of setting a main tracking option for determining a main tracking area of the main subject and a sub-tracking option for determining a sub-tracking area of the sub-subject, and operation 2040 may further include an operation of adjusting composition according to the position option, the main tracking option, and the sub-tracking option. The operation of adjusting the composition may include an operation of adjusting the composition such that the composition satisfies the position option, and the output image includes the main tracking area and the sub-tracking area. When the main subject and the sub-subject overlap with each other in the input image for a certain time, the main subject and the sub-subject may be treated as a new main subject, and the position option may be applied to the new main subject.

The photographing control method may further include an operation of displaying a visual effect for recommending at least one subject as at least one of the main subject and the sub-subject. Operation 2040 may include an operation of adjusting the composition based on at least one of camera control and the post-processing of the input image. Operation 2040 may include an operation of generating the output image by adjusting the degree of ambient sound reflected on the output image, based on the relevance between the ambient sound corresponding to the input image and the main subject. Operation 2040 may include an operation of embedding a watermark corresponding to a keyword derived from the at least one subject in the output image.

Operations 2010 to 2040 may be performed sequentially but may not necessarily be performed sequentially. For example, the order of operations 2010 to 2040 may be changed, or at least two of operations 2010 to 2040 may be performed in parallel. Operations 2010 to 2040 may be performed by at least one component of the photographing control device 120 of FIG. 1, at least one component (e.g., the processor 1720) of the electronic device 1701 of FIG. 17, and at least one component (e.g., the processor 1910) of the photographing control device 1900 of FIG. 19. In addition, the descriptions provided with reference to FIGS. 1 to 19 may also apply to the photographing control device.

The electronic device according to various embodiments may be one of various types of electronic devices. The electronic device may include, for example, a portable communication device (e.g., a smartphone), a computer device, a portable multimedia device, a portable medical device, a camera, a wearable device, or a home appliance device. According to an embodiment, the electronic device is not limited to those described above.

It should be understood that various embodiments of the disclosure and the terms used therein are not intended to limit the technological features set forth herein to particular embodiments and include various changes, equivalents, or replacements for a corresponding embodiment. In connection with the description of the drawings, like reference numerals may be used for similar or related components. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question and may refer to components in other aspects (e.g., importance or order) is not limited. It is to be understood that if a component (e.g., a first component) is referred to, with or without the term "operatively" or "communicatively", as "coupled with", "coupled to", "connected with", or "connected to" another component (e.g., a second component), it means that the component may be coupled with the other component directly (e.g., by wire), wirelessly, or via a third component.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Embodiments as set forth herein may be implemented as software (e.g., the program 1740) including one or more instructions that are stored in a storage medium (e.g., an internal memory 1736, an external memory 1738, or the memory 1920) that is readable by a machine (e.g., the photographing control device 120, the electronic device 1701, or the photographing control device 1900). For example, a processor (e.g., the processor 1720 or the processor 1910) of the machine (e.g., the photographing control device 120, the electronic device 1701, or the photographing control device 1900) may invoke at least one of the one or more instructions stored in the storage medium and may execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., a compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as a memory of the manufacturer's server, a server of the application store, or a relay server.

According to an embodiment, each component (e.g., a module or a program) of the above-described components may include a single entity or multiple entities, and some of the multiple entities may be separately disposed in different components. According to an embodiment, one or more of the above-described components may be omitted, or one or more other components may be added. Alternatively or additionally, a plurality of components (e.g., modules or programs) may be integrated into a single component. In such a case, according to an embodiment, the integrated component may still perform one or more functions of each of the plurality of components in the same or similar manner as they are performed by a corresponding one among the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A photographing control method performed by a photographing control device, the photographing control method comprising:
   receiving, by the photographing control device from a camera, an input image comprising at least one subject;
   determining, by the photographing control device, a main subject among the at least one subject;
   based on the main subject, setting, by the photographing control device, a position option for determining an arrangement in an output image of the main subject, the setting of the position option including setting the position option from among at least three different position options configured to arrange the main subject in three different areas, respectively, of the output image, the three different areas including a left area of the output image, a center area of the output image, and a right area of the output image; and
   based on the input image and the position option, generating the output image having a composition satisfying the position option.

2. The photographing control method of claim 1,
   wherein the position option comprises at least one of a first position option, a second position option, and a third position option,
   wherein the first position option is configured to arrange the main subject in the left area of the output image, wherein the second position option is configured to arrange the main subject in the center area of the output image, and wherein the third position option is configured to arrange the main subject in the right area of the output image.

3. The photographing control method of claim 1, further comprising:

setting, by the photographing control device, a tracking option for determining a tracking area of the main subject, wherein the generating of the output image comprises adjusting the composition according to the position option and the tracking option.

4. The photographing control method of claim 3, wherein the tracking option comprises at least one of a first tracking option, a second tracking option, a third tracking option, and a fourth tracking option, wherein the first tracking option is configured to track a face of the main subject, wherein the second tracking option is configured to track an upper body of the main subject, wherein the third tracking option is configured to track a full body of the main subject, and wherein the fourth tracking option is configured to track a custom region defined for the main subject.

5. The photographing control method of claim 4, wherein the generating of the output image further comprises adjusting the composition by repeating extension and contraction of the main subject when the fourth tracking option is selected.

6. The photographing control method of claim 5, wherein the tracking option further comprises different items according to a category of the main subject.

7. The photographing control method of claim 1, further comprising:

determining, by the photographing control device, a sub-subject among the at least one subject.

8. The photographing control method of claim 7, further comprising:

setting, by the photographing control device, a main tracking option and a sub-tracking option, the main tracking option being configured to determine a main tracking area of the main subject and the sub-tracking option being configured to determine a sub-tracking area of the sub-subject, wherein the generating of the output image comprises adjusting the composition according to the position option, the main tracking option, and the sub-tracking option.

9. The photographing control method of claim 8, wherein the adjusting of the composition comprises adjusting the composition such that the composition satisfies the position option and the output image comprises the main tracking area and the sub-tracking area.

10. The photographing control method of claim 7, further comprising:

based on the main subject and the sub-subject overlapping with each other in the input image for a certain period of time, treating, by the photographing control device, the main subject and the sub-subject as a new main subject, wherein the position option is applied to the new main subject.

11. The photographing control method of claim 7, further comprising:

displaying, by the photographing control device, a visual effect for recommending the at least one subject as at least one of the main subject and the sub-subject.

12. The photographing control method of claim 1, wherein the generating of the output image comprises adjusting the composition based on at least one of control of a camera and post-processing of the input image.

13. The photographing control method of claim 1, wherein the generating of the output image comprises generating the output image by adjusting a degree of ambient sound reflected on the output image, based on a relevance between the ambient sound corresponding to the input image and the main subject.

14. The photographing control method of claim 1, wherein the generating the output image comprises embedding a watermark corresponding to a keyword derived from the at least one subject in the output image.

15. An electronic device comprising:

a camera configured to generate an input image comprising at least one subject;

memory storing one or more computer programs; and one or more processors communicatively coupled to the camera and the memory, wherein the one or more computer programs include computer-executable instructions that, when executed by the one or more processors individually or collectively, cause the electronic device to:

determine a main subject among the at least one subject of the input image, based on the main subject, set a position option for determining an arrangement in an output image of the main subject, the setting of the position option including setting the position option from among at least three different position options configured to arrange the main subject in three different areas, respectively, of the output image, the three different areas including a left area of the output image, a center area of the output image, and a right area of the output image, set a main tracking option for determining a main tracking area of the main subject, and based on the input image, generate the output image having a composition satisfying the position option and the main tracking option.

16. The electronic device of claim 15, wherein the one or more computer programs further include computer-executable instructions that, when executed by the one or more processors individually or collectively, cause the electronic device to:

when the main subject and a sub-subject overlap with each other in the input image for a certain period of time, treat the main subject and the sub-subject as a new main subject, and wherein the position option is applied to the new main subject.

17. The electronic device of claim 15, wherein the one or more computer programs further include computer-executable instructions that, when executed by the one or more processors individually or collectively, cause the electronic device to:

display a visual effect for recommending the at least one subject as at least one of the main subject or a sub-subject.

18. The electronic device of claim 15, wherein the one or more computer programs further include computer-executable instructions that, when executed by the one or more processors individually or collectively, cause the electronic device to:
generate the output image by adjusting a degree of ambient sound reflected on the output image, based on a relevance between the ambient sound corresponding to the input image and the main subject.

19. The electronic device of claim 15, wherein the one or more computer programs further include computer-executable instructions that, when executed by the one or more processors individually or collectively, cause the electronic device to:
embed a watermark corresponding to a keyword derived from the at least one subject in the output image.

20. A photographing control method comprising:
receiving, by a photographing control device from a camera, an input image including at least one subject;
determining, by the photographing control device, a main subject and a sub-subject among the at least one subject;
setting, by the photographing control device, a position option for determining an arrangement in an output image of the main subject;
generating, by the photographing control device, the output image having composition satisfying the position option, based on the input image; and
based on the main subject and the sub-subject overlapping with each other in the input image for a certain period of time, treating, by the photographing control device, the main subject and the sub-subject as a new main subject,
wherein the position option is applied to the new main subject.

* * * * *